(12) United States Patent
Hyun et al.

(10) Patent No.: US 11,985,405 B2
(45) Date of Patent: May 14, 2024

(54) CAMERA MODULE

(71) Applicant: SAMSUNG ELECTRO-MECHANICS CO., LTD., Suwon-si (KR)

(72) Inventors: Hae Seung Hyun, Suwon-si (KR); Kyoung Tai Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 216 days.

(21) Appl. No.: 17/849,218

(22) Filed: Jun. 24, 2022

(65) Prior Publication Data
US 2023/0075426 A1 Mar. 9, 2023

(30) Foreign Application Priority Data
Sep. 3, 2021 (KR) .................. 10-2021-0117404

(51) Int. Cl.
*H04N 23/54* (2023.01)
*G02B 7/02* (2021.01)
*H04N 23/51* (2023.01)
*H04N 23/55* (2023.01)

(52) U.S. Cl.
CPC ............ *H04N 23/54* (2023.01); *H04N 23/51* (2023.01); *H04N 23/55* (2023.01); *G02B 7/022* (2013.01)

(58) Field of Classification Search
CPC ............ G02B 13/009; G02B 7/10–105; G02B 27/646
See application file for complete search history.

(56) References Cited

U.S. PATENT DOCUMENTS

| | | | |
|---|---|---|---|
| 7,394,603 B2 * | 7/2008 | Shiraki | G02B 7/08 359/823 |
| 11,163,133 B2 * | 11/2021 | Shin | H02K 41/031 |
| 11,310,405 B2 * | 4/2022 | Shabtay | G02B 13/0065 |
| 2017/0139225 A1 | 5/2017 | Lim | |
| 2021/0072495 A1 | 3/2021 | Shin et al. | |

FOREIGN PATENT DOCUMENTS

| | | | | |
|---|---|---|---|---|
| KR | 10-2017-0056387 A | | 5/2017 | |
| KR | 10-2018-0135392 A | | 12/2018 | |
| KR | 10-2019-0128279 A | | 11/2019 | |
| KR | 10-2021-0002820 A | | 1/2021 | |
| KR | 10-2021-0013875 A | | 2/2021 | |
| KR | 10-2021-0030724 A | | 3/2021 | |
| KR | 20210041947 A | * | 4/2021 | ............ G03B 13/36 |

OTHER PUBLICATIONS

Korean Office Action issued on Mar. 8, 2023, in counterpart Korean Patent Application No. 10-2021-0117404 (5 pages in English, 4 pages in Korean).

* cited by examiner

*Primary Examiner* — Leon W Rhodes, Jr.
(74) *Attorney, Agent, or Firm* — NSIP Law

(57) ABSTRACT

A camera module includes a housing, a first lens module configured to be movable in a first direction of the housing, a second lens module configured to be movable in the first direction, a first magnet disposed on the first lens module, a first yoke member disposed on the housing so as to face a first side surface of the first magnet and configured to limit a movement position of the first lens module with respect to the housing, and a second yoke member disposed on the second lens module so as to face a second side surface of the first magnet and configured to limit a movement position of the second lens module with respect to the first lens module.

21 Claims, 16 Drawing Sheets

III-III

CAMERA MODULE

CROSS-REFERENCE TO RELATED APPLICATIONS

This application claims the benefit under 35 USC 119(a) of Korean Patent Application No. 10-2021-0117404 filed on Sep. 3, 2021, in the Korean Intellectual Property Office, the entire disclosure of which is incorporated herein by reference for all purposes.

BACKGROUND

1. Field

The present disclosure relates to a camera module configured to be capable of autofocusing (AF) or zoom.

2. Description of the Background

Camera modules may be mounted on mobile electronic devices. For example, camera modules may be mounted in mobile terminals, laptop computers, virtual reality (VR) or augmented reality (AR) devices, and the like.

A camera module may be configured to be capable of autofocusing (AF) or zoom to improve image capturing quality. As an example, a camera module may clearly capture an image of a subject through an autofocusing function. As another example, the camera module may capture an image of a subject positioned at a distance or may capture an enlarged image of a subject positioned at a short distance, through a zoom function. However, since the mobile electronic devices described above provide substantially narrow installation spaces, it may not be easy to mount camera modules capable of autofocusing and zoom in these mobile electronic devices.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, a first lens module configured to be movable in a first direction of the housing, a second lens module configured to be movable in the first direction, a first magnet disposed on the first lens module, a first yoke member disposed on the housing so as to face a first side surface of the first magnet and configured to limit a movement position of the first lens module with respect to the housing, and a second yoke member disposed on the second lens module so as to face a second side surface of the first magnet and configured to limit a movement position of the second lens module with respect to the first lens module.

The camera module may further include a first driving unit driving the first lens module in the first direction.

The first driving unit may include the first magnet, and a first driving coil disposed on the housing.

The camera module may further include a second driving unit driving the second lens module in the first direction.

The second driving unit may include a second magnet disposed on the second lens module, and a second driving coil disposed on the housing.

The second yoke member may be disposed on a first surface of the second lens module, and the second magnet may be disposed on a second surface of the second lens module.

The camera module may further include first ball bearings disposed between the housing and the first lens module.

The camera module may further include a support part formed to face a first surface of the second lens module extending in the first direction.

The first magnet may be disposed in the support part, and a hole for exposing one or more of the first surface and the second surface of the first magnet may be formed in the support part.

Guide grooves extending along the first direction and accommodating ball bearings therein may be formed in the support part.

The camera module may further include second ball bearings disposed between the support part and the second lens module.

In another general aspect, a camera module includes a first lens module including a first lens group, a second lens module including a second lens group, a housing configured to accommodate the first lens module therein, a first driving unit configured to drive the first lens module in an optical axis direction of the first lens group, a second driving unit configured to drive the second lens module in the optical axis direction, a first yoke member disposed on a first side surface of the housing, a second yoke member disposed on a first side surface of the second lens module, and a magnet disposed on a first side surface of the first lens module, wherein the first yoke member, the magnet, and the second yoke member are sequentially disposed at intervals along a direction crossing an optical axis.

A first surface of the magnet may face the first yoke member, and a second surface of the magnet may face the second yoke member.

The first driving unit may include a first driving magnet disposed on a second side surface of the first lens module, and a first driving coil disposed on a second side of the housing.

The second driving unit may include a second driving coil disposed on a third side surface of the housing, and a second driving magnet disposed on one side surface of the second lens module facing the third side surface of the housing.

The camera module may further include first ball members disposed between the housing and the first lens module, and second ball members disposed between the first lens module and the second lens module.

In another general aspect, a camera module includes a housing, a first magnetic member disposed in the housing, a first lens module disposed in the housing and movable in a first direction, a second magnetic member disposed on the first lens module to face the first magnetic member, a second lens module disposed in the housing and movable in the first direction, a third magnetic member disposed on the second lens module to face the second magnetic member, wherein the first magnetic member and the second magnetic member are pulled towards each other, and wherein the second magnetic member and the third magnetic member are pulled towards each other.

The first magnetic member may include a first yoke member, the second magnetic member may include a first magnet, and the third magnetic member may include a second yoke member.

The camera module may further include a first driving coil disposed on the housing to face the second magnetic member, wherein the second magnetic member may include a first magnet, and wherein magnetic interaction between the first driving coil and the first magnet may move the first lens module in the first direction.

The camera module may further include a second magnet disposed on the second lens module, and a second driving coil disposed on the housing to face the second magnetic member, wherein magnetic interaction between the second driving coil and the second magnet may move the second lens module in the first direction.

The camera module may further include first ball members disposed between the housing and the first lens module, and second ball members disposed between the second lens module and one or more of the housing and the first lens module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
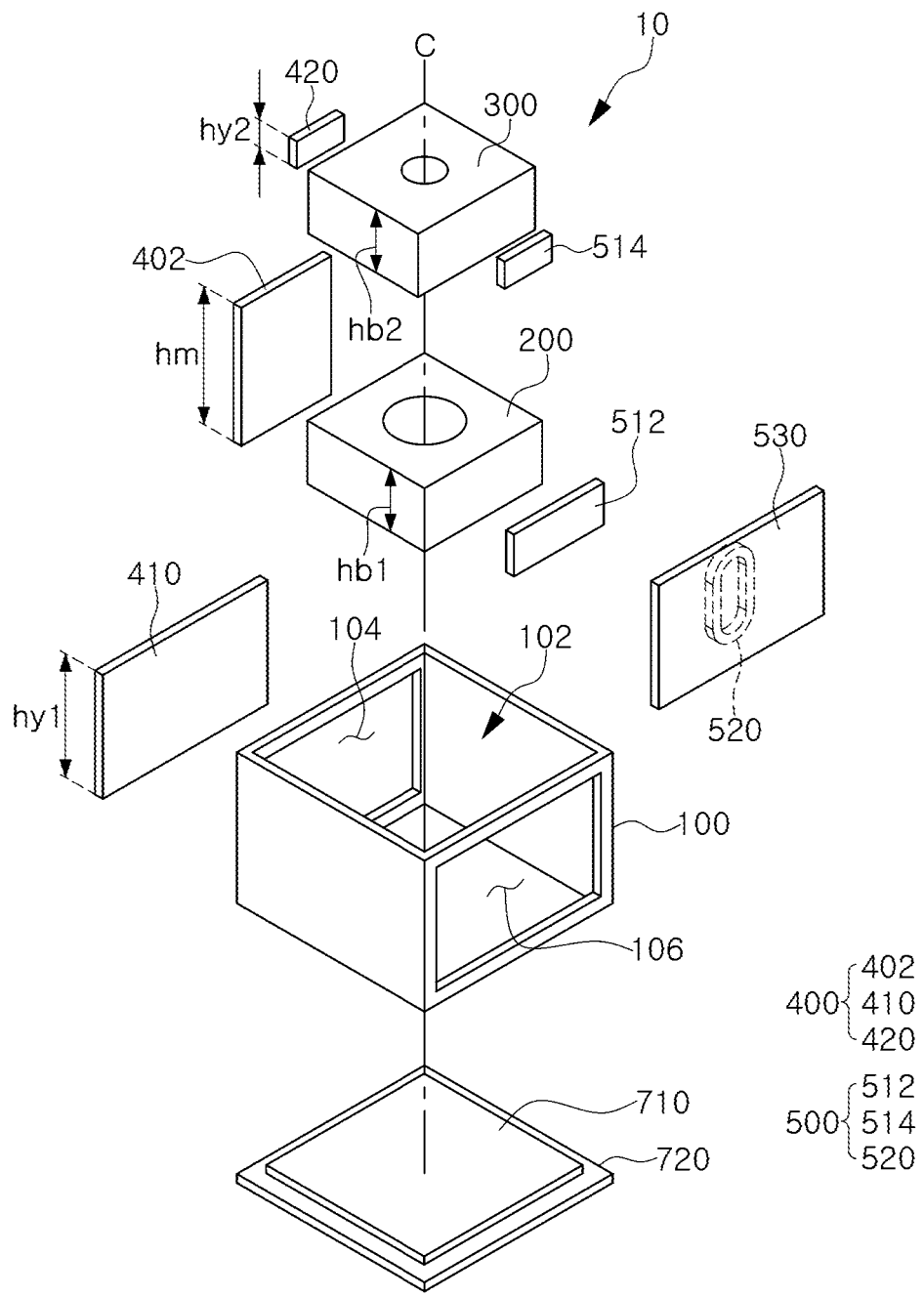
FIG. 1 is an exploded perspective view of a camera module according to an example embodiment.

Hereinafter, while examples of the present disclosure will be described for example with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a camera module capable of being installed in a mobile electronic device and configured to be capable of autofocusing and zoom.

A camera module according to the present disclosure may be mounted in an electronic device. For example, the camera module may be mounted in a mobile terminal, a laptop computer, a virtual reality (VR) device, glasses, or the like. However, the electronic devices in which the camera module may be mounted are not limited to the above-described devices. For example, the camera module may be mounted in all portable electronic devices such as a portable game machine.

A camera module according to an example embodiment in the present disclosure may include a plurality of lens modules. For example, the camera module may include a first lens module and a second lens module respectively configured to be movable in an optical axis direction. In addition, the camera module may further include a housing configured to accommodate the first lens module and the second lens module therein.

The camera module may be configured to significantly decrease fluctuations of the first lens module and the second lens module due to external impact. For example, the camera module may include units for fixing positions of the first lens module and the second lens module (in a non-driven state). In a specific example, the camera module may include a magnet and a yoke member. The magnet may be disposed on the first lens module, and the yoke member may be disposed on the second lens module and the housing. The magnet may be disposed between a first yoke member disposed on the housing and a second yoke member disposed on the second lens module, and may always constantly maintain a position of the first lens module with respect to the housing and a position of the second lens module with respect to the first lens module in the non-driven state of the lens module.

In the camera module configured as described above, it is possible to significantly decrease fluctuations of the lens modules due to external impact while increasing a focal displacement width by driving the plurality of lens modules in the optical axis direction.

Hereinafter, example embodiments in the present disclosure will be described for example with reference to the accompanying drawings.

First, a camera module according to an example embodiment in the present disclosure will be described with reference to FIGS. 1 through 5.

A camera module 10 according to an example embodiment may include a housing 100, a first lens module 200, and a second lens module 300. However, components of the camera module 10 are not limited to the above-described members. For example, the camera module 10 may further include a fixing unit 400 for aligning or maintaining positions of the lens modules 200 and 300 and a driving unit 500 for driving the lens modules 200 and 300. In addition, the camera module 10 may further include an image sensor 710 configured to convert an optical signal incident thereon into an electrical signal. The image sensor 710 may be disposed on the housing 100 via a substrate 720.

The housing 100 may be configured to accommodate the lens modules 200 and 300 therein. For example, a space 102 that may sequentially accommodate the first lens module 200 and the second lens module 300 therein may be formed in the housing 100. The space 102 may be formed so as not to hinder the movement of light. For example, the space 102 may be formed to be opened in an optical axis C direction.

The housing 100 may be configured so that the fixing unit 400 and the driving unit 500 may be disposed. For example, different side parts 104 and 106 of the housing 100 may be formed to be partially opened or completely opened so that some components of the fixing unit 400 and some components of the driving unit 500 may be disposed.

The first lens module 200 may be configured to allow light incident on the camera module to form an image on the image sensor 710. To this end, the first lens module 200 may include one or more lenses having predetermined refractive power. For example, the first lens module 200 may include two or more lenses having positive or negative refractive power. However, the number of lenses accommodated in the first lens module 200 is not limited to two. The first lens module 200 may be configured to be movable in the optical axis C direction. For example, the first lens module 200 may move toward the second lens module 300 or move toward the image sensor 710, by the driving unit 500.

The second lens module 300 may be configured to allow the light incident on the camera module to be incident on the first lens module 200 or reflect the light incident on the camera module to the first lens module 200. To this end, the second lens module 300 may include one or more lenses having predetermined refractive power. For example, the second lens module 300 may include one or more lenses having positive or negative refractive power. However, the number of lenses accommodated in the second lens module 300 is not limited to one. The second lens module 300 may be configured to be movable in the optical axis C direction. For example, the second lens module 300 may move toward an object (subject) or move toward the first lens module 200, by the driving unit 500.

The fixing unit 400 may be configured to align or constantly maintain the positions of the first lens module 200 and the second lens module 300. As an example, the fixing unit 400 may align the positions of the first lens module 200 and the second lens module 300 so that optical axes of the first lens module 200 and the second lens module 300 coincide with each other. As another example, the fixing unit 400 may constantly maintain the positions of the first lens module 200 and the second lens module 300 in a non-driven state so that the first lens module 200 and the second lens module 300 do not collide with each other or do not collide with inner walls of the housing or the image sensor due to external impact.

The fixing unit 400 may include a magnet 402 and yoke members 410 and 420. For example, the fixing unit 400 may include one magnet 402, a first yoke member 410, and a second yoke member 420. However, components of the fixing unit 400 are not limited thereto. For example, the fixing unit 400 may also include two magnets and one yoke member.

The magnet 402 may be disposed on the first lens module 200. For example, the magnet 402 may be disposed on one surface of the first lens module 200 substantially parallel to an optical axis C. The magnet 402 may be formed to have a considerable size. For example, a height of the magnet 402 (in the optical axis direction) may be greater than a height of the first lens module 200. As a specific example, a height hm of the magnet 402 may be substantially equal to or smaller than the sum (hb1+hb2) of a height hb1 of the first lens module 200 and the height hb2 of the second lens module 300. A polarity of the magnet 402 may be formed along the optical axis C direction. For example, the magnet 402 may be configured to form the greatest magnetic force at both ends thereof in the optical axis C direction. However, a polarity direction of the magnet 402 is not limited thereto.

The first yoke member 410 may be disposed on the housing 100. For example, the first yoke member 410 may be disposed on one side of the housing 100 facing a first surface of the magnet 402 disposed on the first lens module 200. As a specific example, the first yoke member 410 may be disposed to face a first polarity formed on the first surface of the magnet 402. Accordingly, an attractive force of a predetermined magnitude may always act between the first yoke member 410 and the magnet 402. The attractive force formed between the first yoke member 410 and the magnet 402 may enable position-aligning and position-fixing of the first lens module 200 with respect to the housing 100. The first yoke member 410 may be formed to have a considerable size. For example, the first yoke member 410 may be formed to have a smaller size than the magnet 402. As a specific example, a height hy1 of the first yoke member 410 may be smaller than ½ of the height hm of the magnet 402.

The second yoke member 420 may be disposed on the second lens module 300. For example, the second yoke member 420 may be disposed on one side of the second lens module 300 facing a second surface of the magnet 402 disposed on the first lens module 200. As a specific example, the second yoke member 420 may be disposed to face a second polarity formed on the second surface of the magnet 402. Accordingly, an attractive force of a predetermined magnitude may always act between the second yoke member 420 and the magnet 402. The attractive force formed between the second yoke member 420 and the magnet 402 may enable position-aligning and position-fixing of the second lens module 300 with respect to the first lens module 200. The second yoke member 420 may be formed to have a considerable size. For example, the second yoke member 420 may be formed to have a smaller size than the magnet 402. As a specific example, a height hy2 of the second yoke member 420 may be smaller than ½ of the height hm of the magnet 402.

The fixing unit 400 configured as described above may align the positions of the first lens module 200 and the second lens module 300 as described above, and may thus enable accurate image capturing through the first lens module 200 and the second lens module 300. In addition, the fixing unit 400 may fix the positions of the first lens module 200 and the second lens module 300 through the forces of the predetermined magnitudes, and may thus reduce a phenomenon in which the first lens module 200 and the second lens module 300 or other components of the camera module 10 are damaged due to external impact.

The driving unit 500 may be configured to drive the first lens module 200 and the second lens module 300 in the optical axis C direction. As an example, the driving unit 500 may drive the first lens module 200 and the second lens module 300 toward the object or the image sensor at the same time. As another example, the driving unit 500 may drive only one of the first lens module 200 and the second lens module 300 toward the object or the image sensor. As still another example, the driving unit 500 may be configured to drive the first lens module 200 toward the image sensor 710 and drive the second lens module 300 toward the object. As still another example, the driving unit 500 may be configured to drive the first lens module 200 toward the object and drive the second lens module 300 toward the image sensor.

The driving unit 500 may include driving magnets 512 and 514 and a driving coil 520. In addition, the driving unit 500 may further include a circuit board 530. The driving magnets 512 and 514 may be disposed on the first and second lens modules 200 and 300, respectively. For example, a first driving magnet 512 may be disposed on the first lens module 200, and a second driving magnet 514 may be disposed on the second lens module 300. The driving coil 520 may be disposed to face the first driving magnet 512 and the second driving magnet 514. For example, the first driving magnet 512 and the second driving magnet 514 may be disposed to face one driving coil 520.

The first driving magnet 512 and the second driving magnet 514 may generate predetermined driving forces through interactions with the driving coil 520. As an example, the first driving magnet 512 may generate driving force required for driving the first lens module 200 in the optical axis direction by interacting with the driving coil 520, and the second driving magnet 514 may generate driving force required for driving the second lens module 300 in the optical axis direction by interacting with the driving coil 520.

The driving magnets 512 and 514 and the driving coil 520 may be configured to drive the first and second lens modules 200 and 300 in various forms.

As an example, the first driving magnet 512 and the second driving magnet 514 may be configured to generate driving force of the same magnitude through interactions with the driving coil 520. For example, driving force generated between the first driving magnet 512 and the driving coil 520 may have the same magnitude as driving force generated between the second driving magnet 514 and the driving coil 520. Accordingly, when a driving current is supplied to the driving coil 520, the first lens module 200 and the second lens module 300 may be driven with a displacement of the same magnitude.

As another example, the first driving magnet 512 and the second driving magnet 514 may be configured to generate driving forces of different magnitudes through interactions with the driving coil 520. For example, driving force generated between the first driving magnet 512 and the driving coil 520 may be smaller or greater than driving force generated between the second driving magnet 514 and the driving coil 520. Accordingly, when a driving current is supplied to the driving coil 520, the first lens module 200 and the second lens module 300 may be driven with displacements of different magnitudes. For reference, such a type of driving may be performed by forming the first driving magnet 512 and the second driving magnet 514 in different sizes.

As still another example, the first driving magnet 512 and the second driving magnet 514 may be configured to generate driving forces in different directions through interactions with the driving coil 520. For example, a direction of driving force generated between the first driving magnet 512 and the driving coil 520 may be opposite to a direction of driving force generated between the second driving magnet 514 and the driving coil 520. Accordingly, when a driving current is supplied to the driving coil 520, the first lens module 200 and the second lens module 300 may be driven in opposite directions. For reference, such a type of driving may be performed by forming the first driving magnet 512 and the second driving magnet 514 so that directions of polarities of the first driving magnet 512 and the second driving magnet 514 are symmetrical to each other.

The driving unit 500 configured as described above may enable autofocusing (AF) or zoom of the camera module 10 by moving the first lens module 200 and the second lens module 300 in the optical axis C direction.

Figure 2:
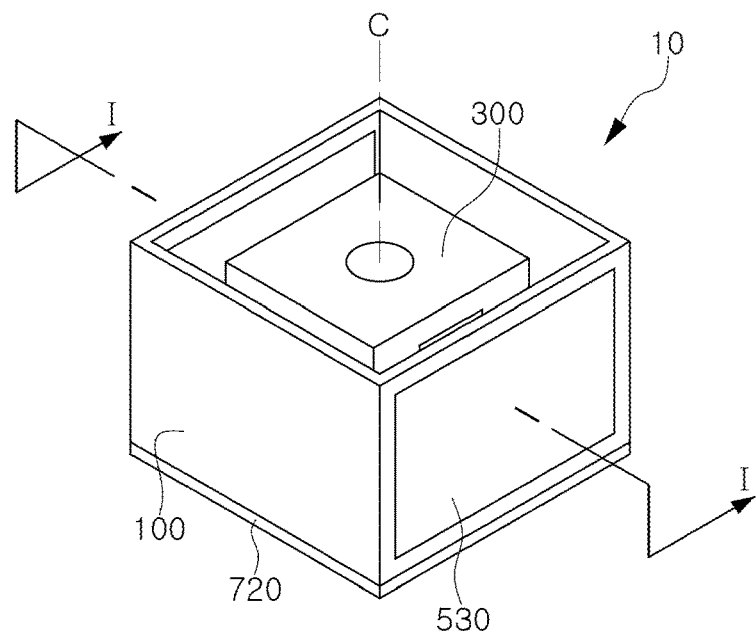
FIG. 2 is an assembled perspective view of the camera module illustrated in FIG. 1.

The camera module 10 including the above-described components may be configured to be mounted in an electronic device. For example, the camera module 10 may be manufactured in a thin form as illustrated in FIG. 2. Accordingly, the camera module 10 according to the present example embodiment may be mounted in a smartphone, a virtual reality (VR) device, an augmented reality (AR) device, a laptop computer, or the like.

An assembled cross-sectional structure of the camera module 10 will be described with reference to FIG. 3.

Figure 3:
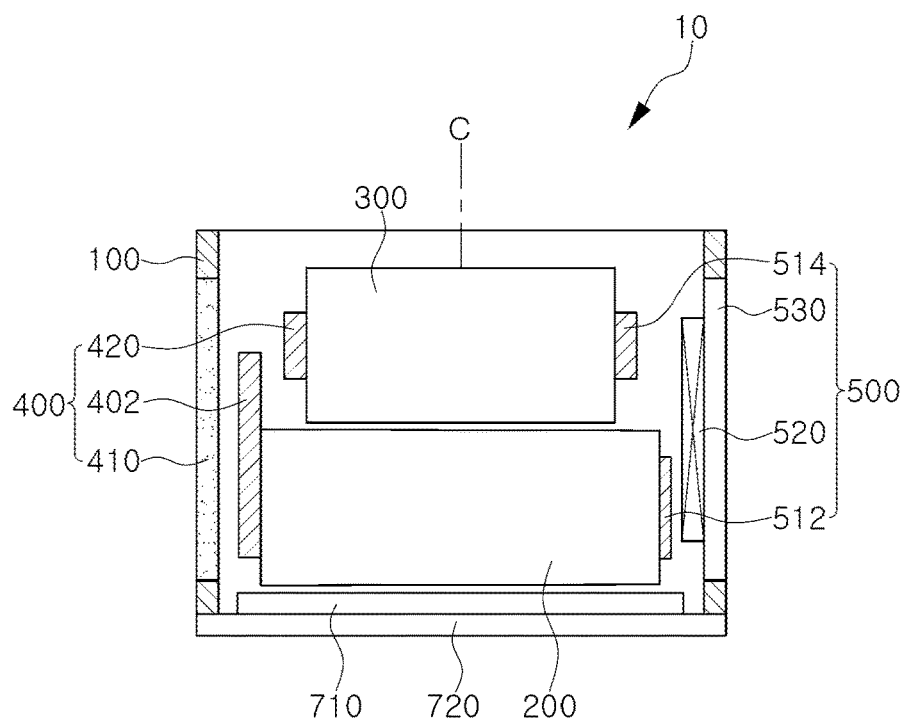
FIG. 3 is a cross-sectional view of the camera module illustrated in FIG. 2.

The camera module 10 may include the first lens module 200 and the second lens module 300 as illustrated in FIG. 3. The first lens module 200 and the second lens module 300 may be sequentially disposed in the optical axis C direction. As a specific example, the first lens module 200 may be disposed below the second lens module 300 (that is, disposed adjacent to the image sensor). Accordingly, the light incident to the camera module 10 may sequentially pass through the second lens module 300 and the first lens module 200 and then be incident (form an image) on the image sensor 710. The first lens module 200 and the second lens module 300 may be configured to have different optical characteristics. As an example, a first optical system or a first lens group constituting the first lens module 200 may be configured to have positive refractive power, and a second optical system or a second lens group constituting the second lens module 300 may be configured to have negative refractive power. However, the optical characteristics of the first lens module 200 and the second lens module 300 are not limited thereto.

The first lens module 200 and the second lens module 300 may be maintained at constant positions in the non-driven state. As an example, a position of the first lens module 200 in the optical axis C direction may be fixed by the attractive force between the magnet 402 disposed on one side of the first lens module 200 and the first yoke member 410 disposed on one side of the housing 100. As another example, a position of the second lens module 300 in the optical axis C direction may be fixed by the attractive force between the second yoke member 420 disposed on one side of the second lens module 300 and the magnet 402 disposed on the first lens module 200.

Positions of the first lens module 200 and the second lens module 300 in a direction crossing the optical axis in a driven state may be constantly maintained. As an example, a position of the first lens module 200 in the direction crossing the optical axis C may be constantly maintained by the attractive force between the magnet 402 and the first yoke member 410 and an attractive force between the driving magnet 512 and the driving coil 520. As another example, a position of the second lens module 300 in the direction crossing the optical axis C may be constantly maintained by the attractive force between the magnet 402 and the second yoke member 420 and an attractive force between the driving magnet 514 and the driving coil 520.

Accordingly, in the camera module 10 according to the present example embodiment, it is possible to implement stable driving of the first lens module 200 and the second lens module 300 while significantly decreasing a shake of the first lens module 200 and the second lens module 300 due to external impact.

Figure 4:
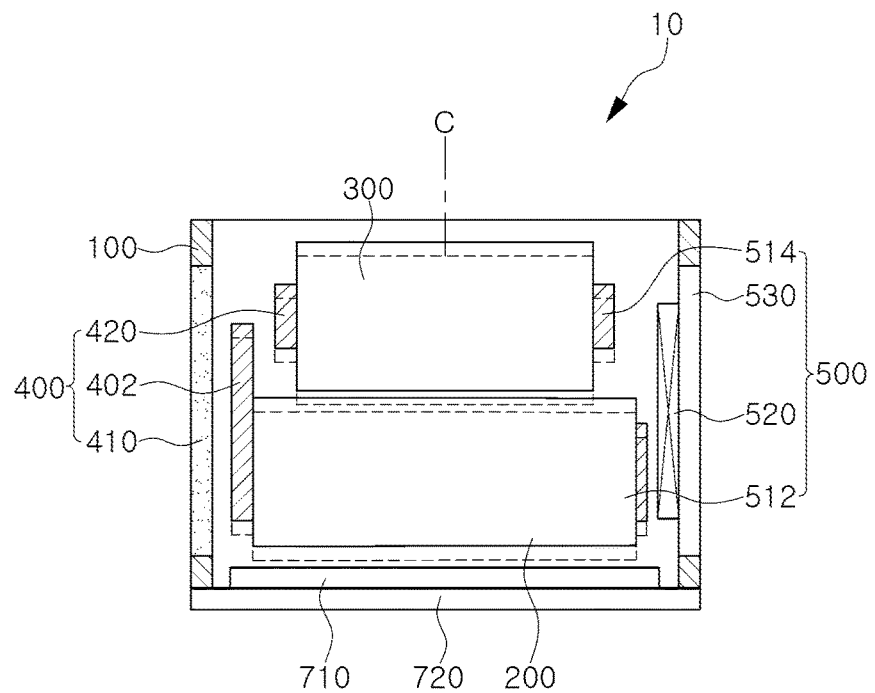
FIGS. 4 and 5 are cross-sectional views illustrating use states of the camera module illustrated in FIG. 3.
Figure 5:
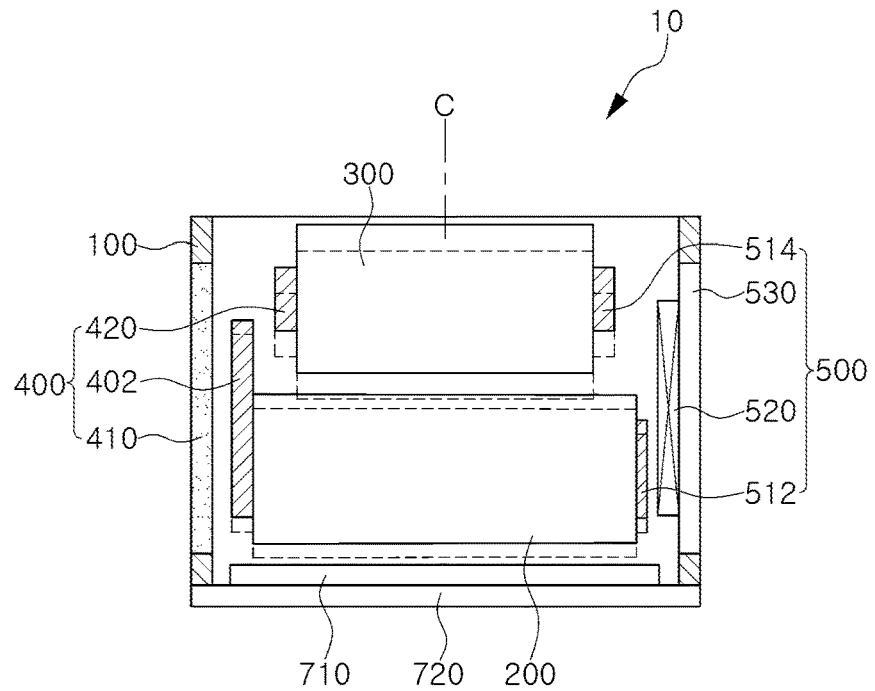
Figure 6:
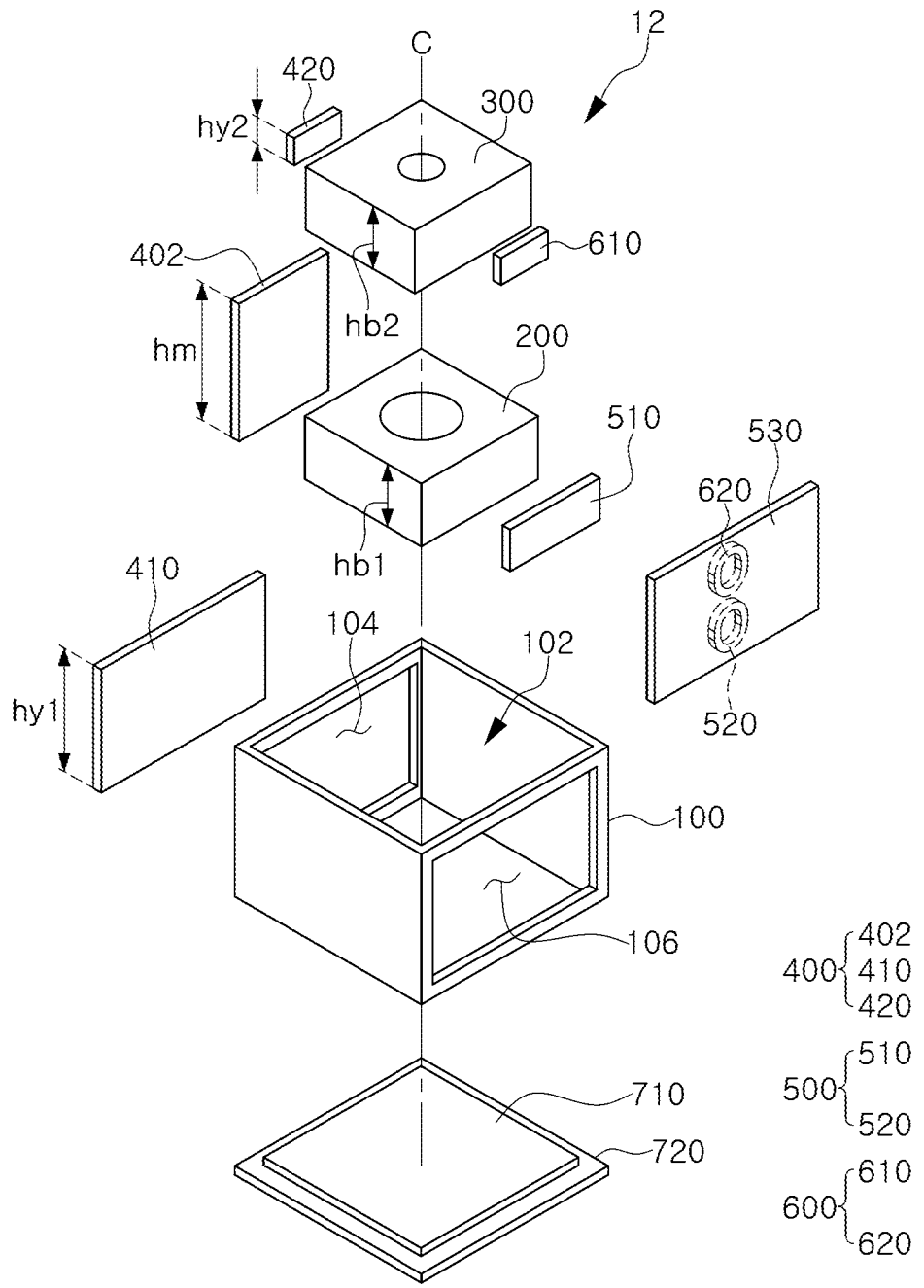
FIG. 6 is an exploded perspective view of a camera module according to another example embodiment.
Figure 7:
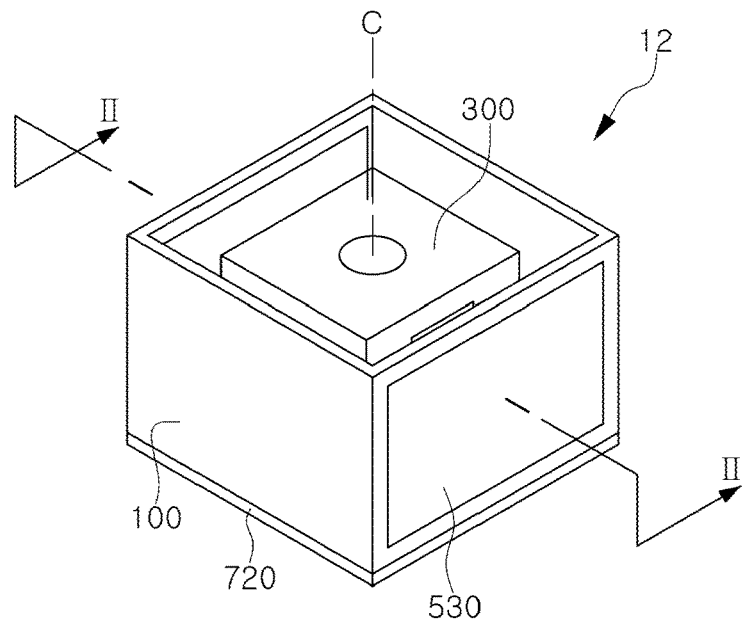
FIG. 7 is an assembled perspective view of the camera module illustrated in FIG. 6.

An operation example of the camera module 10 will be described with reference to FIGS. 4 and 5.

The camera module 10 may perform the autofocusing (AF) and the zoom by driving the lens modules 200 and 300 in the optical axis C direction. As an example, the camera module 10 may perform the autofocusing (AF) and the zoom by moving the first lens module 200 and the second lens module 300 with the same displacement as illustrated in FIG. 4 or moving the first lens module 200 and the second lens module 300 with different displacements as illustrated in Next, a camera module according to another example embodiment will be described with reference to FIGS. 6 through 11.

A camera module 12 according to another example embodiment may include a housing 100, a first lens module 200, and a second lens module 300. However, components of the camera module 12 are not limited to the above-described members. For example, the camera module 12 may further include a fixing unit 400 for aligning or maintaining positions of the lens modules 200 and 300 and first and second driving units 500 and 600 for driving the lens modules 200 and 300. In addition, the camera module 12 may further include an image sensor 710 configured to convert an optical signal incident thereon into an electrical signal. The image sensor 710 may be disposed on the housing 100 via a substrate 720.

The housing 100 may be configured to accommodate the lens modules 200 and 300 therein. For example, a space 102 that may sequentially accommodate the first lens module 200 and the second lens module 300 therein may be formed in the housing 100. The space 102 may be formed so as not to hinder the movement of light. For example, the space 102 may be formed to be opened in an optical axis C direction.

The housing 100 may be configured so that the fixing unit 400 and the driving units 500 and 600 may be disposed. For example, different side parts 104 and 106 of the housing 100 may be formed to be partially opened or completely opened so that some components of the fixing unit 400 and some components of the driving units 500 and 600 may be disposed.

The first lens module 200 may be configured to allow light incident on the camera module to form an image on the image sensor 710. To this end, the first lens module 200 may include one or more lenses having predetermined refractive power. For example, the first lens module 200 may include two or more lenses having positive or negative refractive power. However, the number of lenses accommodated in the first lens module 200 is not limited to two. The first lens module 200 may be configured to be movable in the optical axis C direction. For example, the first lens module 200 may move toward the second lens module 300 or move toward the image sensor 710, by the first driving unit 500.

The second lens module 300 may be configured to allow the light incident on the camera module to be incident on the first lens module 200 or reflect the light incident on the camera module to the first lens module 200. To this end, the second lens module 300 may include one or more lenses having predetermined refractive power. For example, the second lens module 300 may include one or more lenses having positive or negative refractive power. However, the number of lenses accommodated in the second lens module 300 is not limited to one. The second lens module 300 may be configured to be movable in the optical axis C direction. For example, the second lens module 300 may move toward an object (subject) or move toward the first lens module 200, by the second driving unit 600.

The fixing unit 400 may be configured to align or constantly maintain the positions of the first lens module 200 and the second lens module 300. As an example, the fixing unit 400 may align the positions of the first lens module 200 and the second lens module 300 so that optical axes of the first lens module 200 and the second lens module 300 coincide with each other. As another example, the fixing unit 400 may constantly maintain the positions of the first lens module 200 and the second lens module 300 in a non-driven state so that the first lens module 200 and the second lens module 300 do not collide with each other or do not collide with inner walls of the housing or the image sensor due to external impact.

The fixing unit 400 may include a magnet 402 and yoke members 410 and 420. For example, the fixing unit 400 may include one magnet 402, a first yoke member 410, and a second yoke member 420. However, components of the fixing unit 400 are not limited thereto. For example, the fixing unit 400 may also include two magnets and one yoke member.

The magnet 402 may be disposed on the first lens module 200. For example, the magnet 402 may be disposed on one surface of the first lens module 200 substantially parallel to an optical axis C. The magnet 402 may be formed to have a considerable size. For example, a height of the magnet 402 (in the optical axis direction) may be greater than a height of the first lens module 200. A polarity of the magnet 402 may be formed along the optical axis C direction. For example, the magnet 402 may be configured to form the greatest magnetic force at both ends thereof in the optical axis C direction. However, a polarity direction of the magnet 402 is not limited thereto.

The first yoke member 410 may be disposed on the housing 100. For example, the first yoke member 410 may be disposed on one side of the housing 100 facing a first surface of the magnet 402 disposed on the first lens module 200. As a specific example, the first yoke member 410 may be disposed to face a first polarity formed on the first surface of the magnet 402. Accordingly, an attractive force of a predetermined magnitude may always act between the first yoke member 410 and the magnet 402. The attractive force formed between the first yoke member 410 and the magnet 402 may enable position-aligning and position-fixing of the first lens module 200 with respect to the housing 100. The first yoke member 410 may be formed to have a considerable size. For example, the first yoke member 410 may be formed to have a smaller size than the magnet 402.

The second yoke member 420 may be disposed on the second lens module 300. For example, the second yoke member 420 may be disposed on one side of the second lens module 300 facing a second surface of the magnet 402 disposed on the first lens module 200. As a specific example, the second yoke member 420 may be disposed to face a second polarity formed on the second surface of the magnet 402. Accordingly, an attractive force of a predetermined magnitude may always act between the second yoke member 420 and the magnet 402. The attractive force formed between the second yoke member 420 and the magnet 402 may enable position-aligning and position-fixing of the second lens module 300 with respect to the first lens module 200. The second yoke member 420 may be formed to have a considerable size. For example, the second yoke member 420 may be formed to have a smaller size than the magnet 402.

The fixing unit 400 configured as described above may align the positions of the first lens module 200 and the second lens module 300 as described above, and may thus enable accurate image capturing through the first lens module 200 and the second lens module 300. In addition, the fixing unit 400 may fix the positions of the first lens module 200 and the second lens module 300 through the forces of the predetermined magnitudes, and may thus reduce a phenomenon in which the first lens module 200 and the second lens module 300 or other components of the camera module 12 are damaged due to external impact.

The first driving unit 500 may be configured to drive the first lens module 200 in the optical axis C direction. As an example, the first driving unit 500 may drive the first lens module 200 toward the object or the image sensor. The first driving unit 500 may include a first driving magnet 510 and a first driving coil 520. The first driving magnet 510 may be disposed on the first lens module 200. For example, the first driving magnet 510 may be disposed on one surface of the first lens module 200. As a specific example, the first driving magnet 510 may be disposed at a position facing the magnet 402. The first driving coil 520 may be disposed to face the first driving magnet 510. For example, the first driving coil 520 may be disposed on one side 106 of the housing 100 facing the first driving magnet 510 via a circuit board 530. As such, the first driving unit 500 may move the first lens module 200 in the optical axis C direction through driving force generated between the first driving magnet 510 and the first driving coil 520.

The second driving unit 600 may be configured to drive the second lens module 300 in the optical axis C direction. As an example, the second driving unit 600 may drive the second lens module 300 toward the object or the image sensor. The second driving unit 600 may include a second driving magnet 610 and a second driving coil 620. The second driving magnet 610 may be disposed on the second lens module 300. For example, the second driving magnet 610 may be disposed on one surface of the second lens module 300. As a specific example, the second driving magnet 610 may be disposed at a position facing the second yoke member 420. The second driving coil 620 may be disposed to face the second driving magnet 610. For example, the second driving coil 620 may be disposed on one side 106 of the housing 100 facing the second driving magnet 610 via the circuit board 530. As such, the second driving unit 600 may move the second lens module 300 in the optical axis C direction through driving force generated between the second driving magnet 610 and the second driving coil 620.

The camera module 12 may perform autofocusing (AF) and zoom through the first driving unit 500 and the second driving unit 600. As an example, the camera module 12 may perform the autofocusing (AF) and the zoom by moving the first lens module 200 and the second lens module 300 with a displacement of the same magnitude, moving the first lens module 200 and the second lens module 300 with displacements of different magnitudes, or moving the first lens module 200 and the second lens module 300 in different directions.

An assembled cross-sectional structure of the camera module 12 will be described with reference to FIG. 8.

Figure 8:
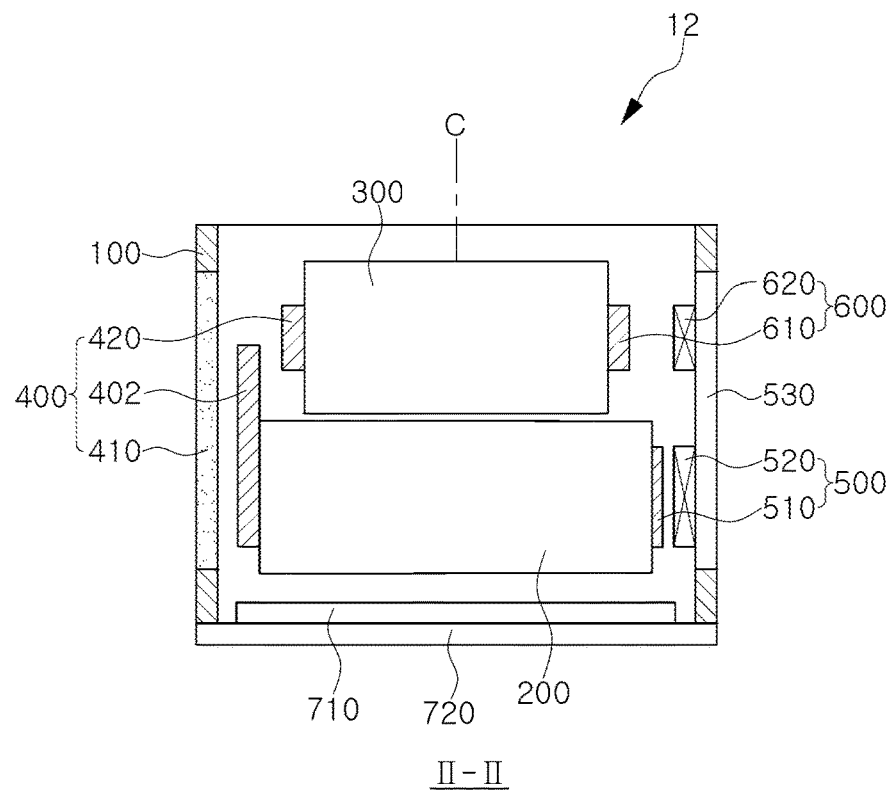
FIG. 8 is a cross-sectional view of the camera module illustrated in FIG. 6.

The camera module 12 may include the first lens module 200 and the second lens module 300 as illustrated in FIG. 8. The first lens module 200 and the second lens module 300 may be sequentially disposed in the optical axis C direction. As a specific example, the first lens module 200 may be disposed below the second lens module 300 (that is, disposed adjacent to the image sensor). Accordingly, the light incident to the camera module 12 may sequentially pass through the second lens module 300 and the first lens module 200 and then be incident (form an image) on the image sensor 710. The first lens module 200 and the second lens module 300 may be configured to have different optical characteristics. As an example, a first optical system or a first lens group constituting the first lens module 200 may be configured to have positive refractive power, and a second optical system or a second lens group constituting the second lens module 300 may be configured to have negative refractive power. However, the optical characteristics of the first lens module 200 and the second lens module 300 are not limited thereto.

The first lens module 200 and the second lens module 300 may be maintained at constant positions in the non-driven state. As an example, a position of the first lens module 200 in the optical axis C direction may be fixed by the attractive force between the magnet 402 disposed on one side of the first lens module 200 and the first yoke member 410 disposed on one side of the housing 100. As another example, a position of the second lens module 300 in the optical axis C direction may be fixed by the attractive force between the second yoke member 420 disposed on one side of the second lens module 300 and the magnet 402 disposed on the first lens module 200.

Positions of the first lens module 200 and the second lens module 300 in a direction crossing the optical axis in a driven state may be constantly maintained. As an example, a position of the first lens module 200 in the direction crossing the optical axis C may be constantly maintained by maintaining a balance between the attractive force between the magnet 402 and the first yoke member 410 and an attractive force between the first driving magnet 510 and the first driving coil 520. As another example, a position of the second lens module 300 in the direction crossing the optical axis C may be constantly maintained by maintaining a balance between the attractive force between the magnet 402 and the second yoke member 420 and an attractive force between the second driving magnet 610 and the second driving coil 620.

Accordingly, in the camera module 12 according to the present example embodiment, it is possible to implement stable driving of the first lens module 200 and the second lens module 300 while significantly decreasing a shake of the first lens module 200 and the second lens module 300 due to external impact.

Figure 9:
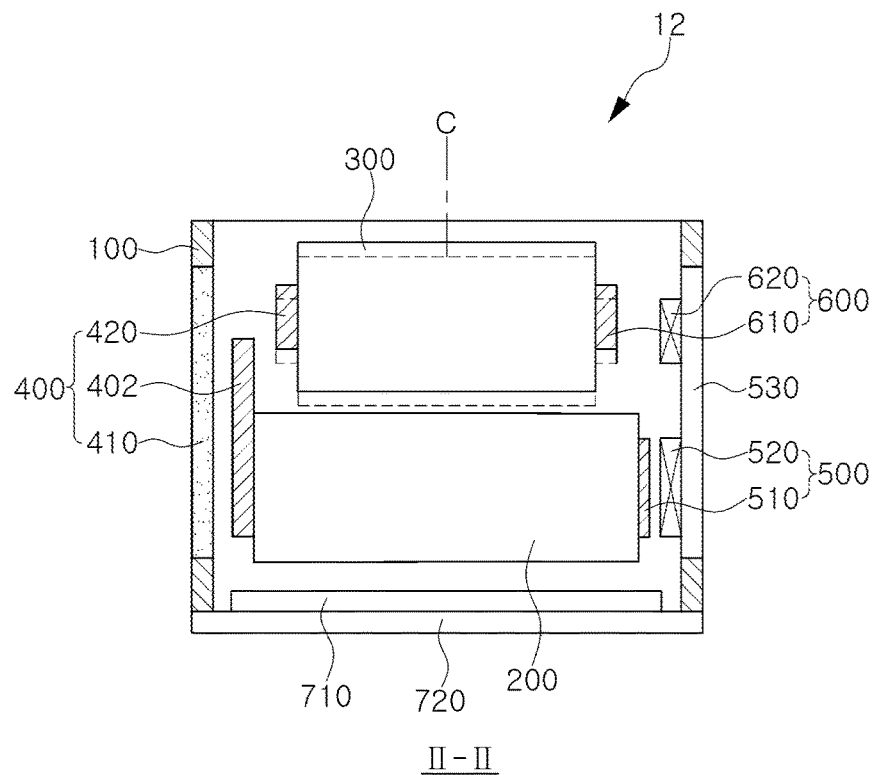
FIGS. 9, 10, and 11 are cross-sectional views illustrating use states of the camera module illustrated in FIG. 8.
Figure 10:
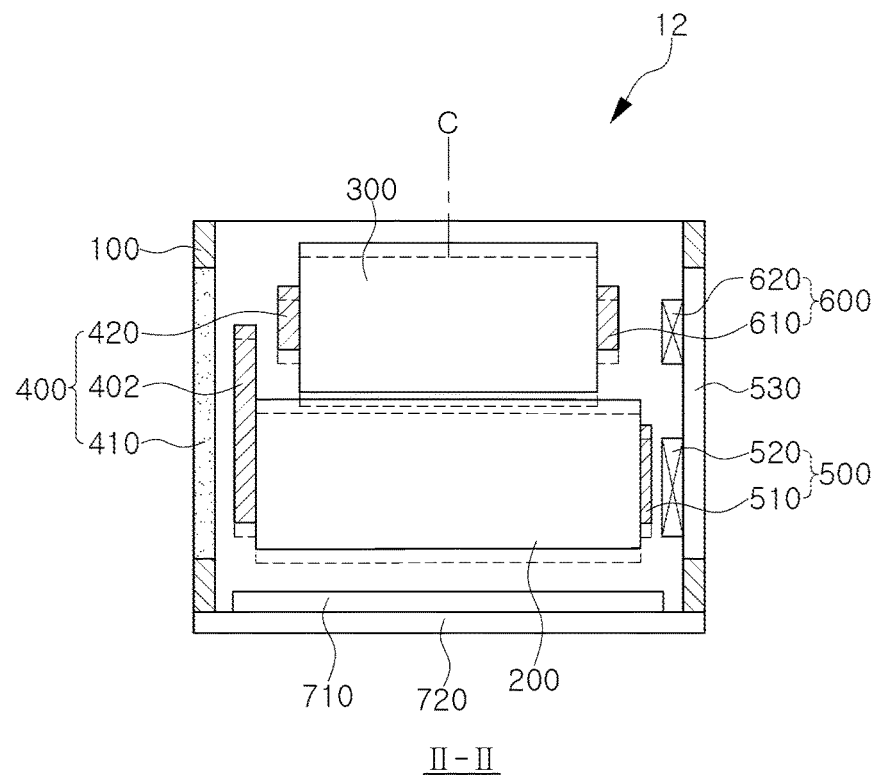
Figure 11:
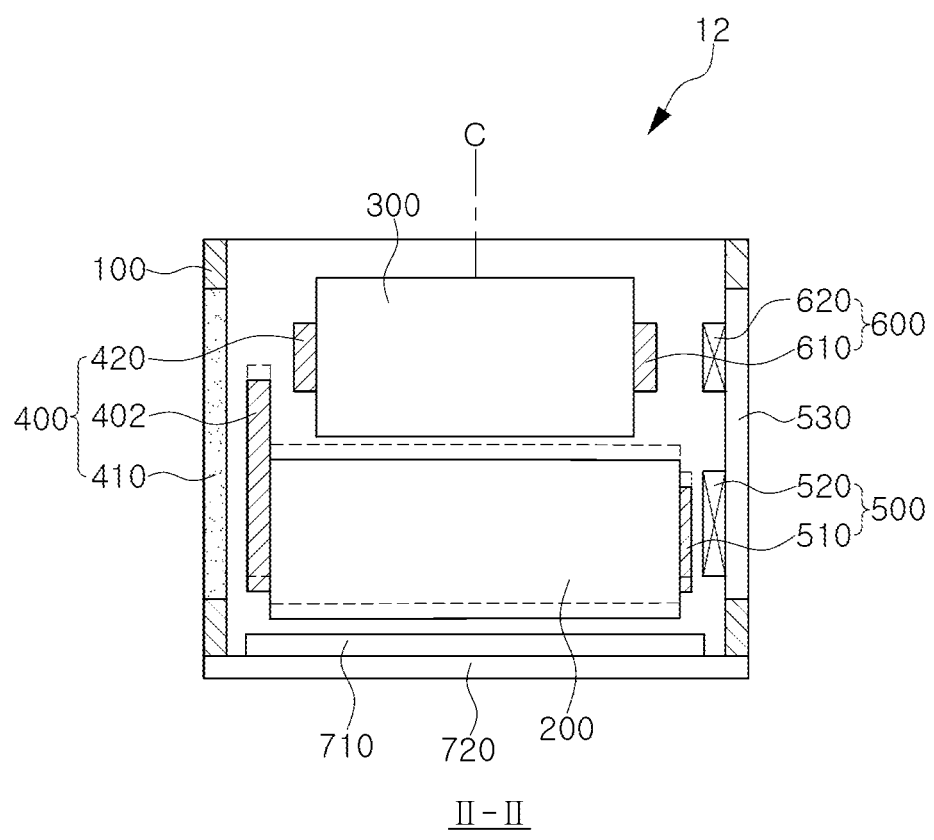
Figure 12:
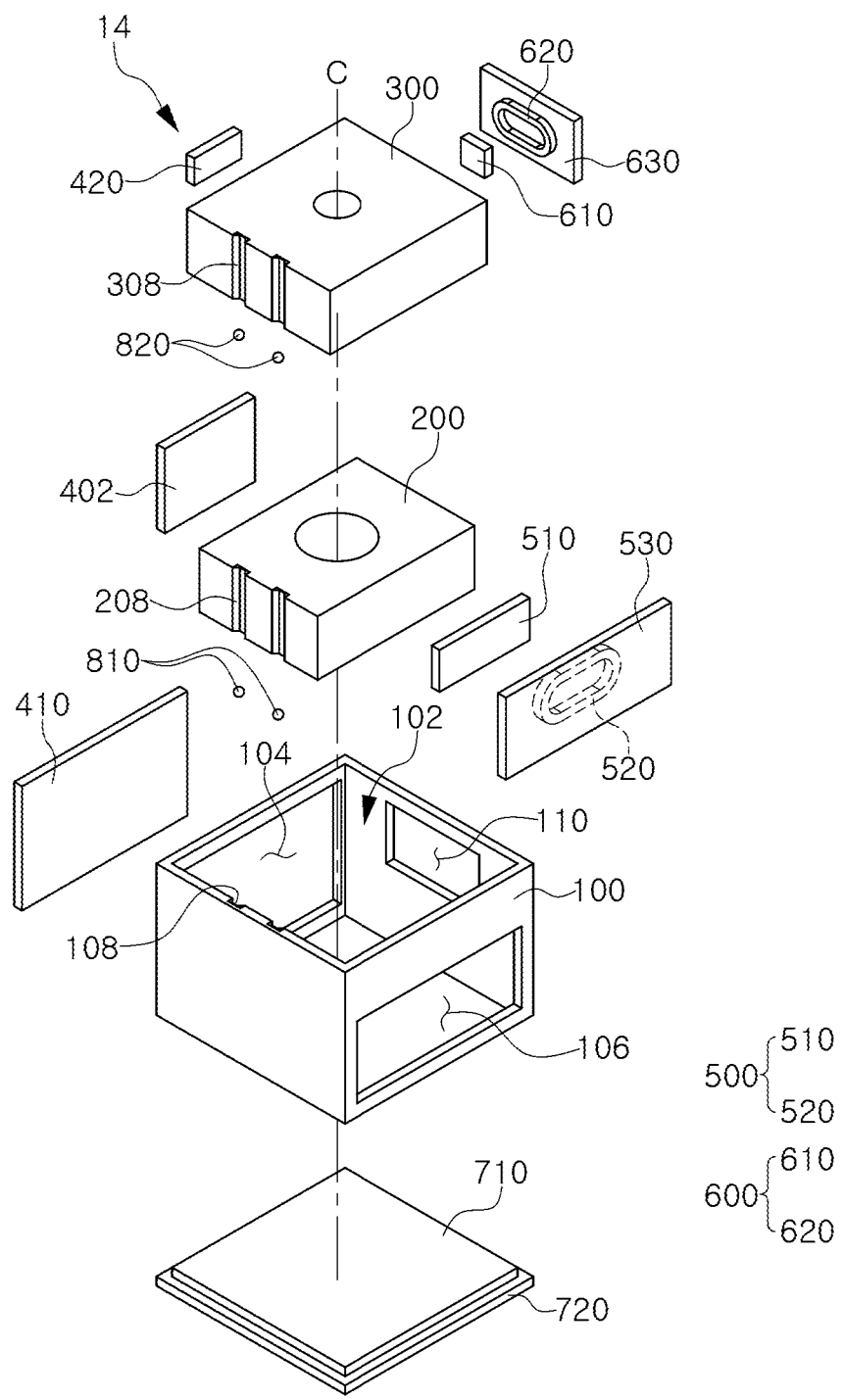
FIG. 12 is an exploded perspective view of a camera module according to still another example embodiment.

An operation example of the camera module 12 will be described with reference to FIGS. 9 through 11.

The camera module 12 may perform the autofocusing (AF) and the zoom by driving the lens modules 200 and 300 in the optical axis C direction. As an example, the camera module 12 may perform the autofocusing (AF) or the zoom by moving only any one of the first lens module 200 and the second lens module 300 as illustrated in FIGS. 9 and 11 or moving both the first lens module 200 and the second lens module 300 as illustrated in FIG. 10.

Next, a camera module according to still another example embodiment will be described with reference to FIGS. 12 through 17.

A camera module 14 according to still another example embodiment may include a housing 100, a first lens module 200, and a second lens module 300. However, components of the camera module 14 are not limited to the above-described members. For example, the camera module 14 may further include a fixing unit 400 for aligning or maintaining positions of the lens modules 200 and 300 and first and second driving units 500 and 600 for driving the lens modules 200 and 300. In addition, the camera module 14 may further include an image sensor 710 configured to convert an optical signal incident thereon into an electrical signal. The image sensor 710 may be disposed on the housing 100 via a substrate 720.

The housing 100 may be configured to accommodate the lens modules 200 and 300 therein. For example, a space 102 that may sequentially accommodate the first lens module 200 and the second lens module 300 therein may be formed in the housing 100. The space 102 may be formed so as not to hinder the movement of light. For example, the space 102 may be formed to be opened in an optical axis C direction.

The housing 100 may be configured so that the fixing unit 400 and the driving units 500 and 600 may be disposed. For example, different side parts 104, 106, and 110 of the housing 100 may be formed to be partially opened or completely opened so that some components of the fixing unit 400 and some components of the driving units 500 and 600 may be disposed.

The housing 100 may be configured to enable the first lens module 200 and the second lens module 300 to be smoothly driven. For example, grooves 108 for accommodating ball bearings 810 and 820 may be formed in an inner wall of one side of the housing 100. The grooves 108 may be formed along the optical axis C direction. The ball bearings 810 and 820 disposed in the grooves 108 may reduce frictional resistance between the inner wall of the housing 100 and the lens modules 200 and 300 to enabling the lens modules 200 and 300 to be smoothly driven. For example, first ball bearings 810 may be disposed between the housing 100 and the first lens module 200 to reduce contact friction between the housing 100 and the first lens module 200, and second ball bearings 820 may be disposed between the housing 100 and the second lens module 300 to reduce contact friction between the housing 100 and the second lens module 300.

The first lens module 200 may be configured to allow light incident on the camera module to form an image on the image sensor 710. To this end, the first lens module 200 may include one or more lenses having predetermined refractive power. For example, the first lens module 200 may include two or more lenses having positive or negative refractive power. However, the number of lenses accommodated in the first lens module 200 is not limited to two. The first lens module 200 may be configured to be movable in the optical axis C direction. For example, the first lens module 200 may move toward the second lens module 300 or move toward the image sensor 710, by the first driving unit 500.

First guide grooves 208 corresponding to the grooves 108 of the housing 100 may be formed in one side of the first lens module 200. The first guide grooves 208 may be formed to face the grooves 108 to form spaces in which the first ball bearings 810 may be accommodated.

The second lens module 300 may be configured to allow the light incident on the camera module to be incident on the first lens module 200 or reflect the light incident on the camera module to the first lens module 200. To this end, the second lens module 300 may include one or more lenses having predetermined refractive power. For example, the second lens module 300 may include one or more lenses having positive or negative refractive power. However, the number of lenses accommodated in the second lens module 300 is not limited to one. The second lens module 300 may be configured to be movable in the optical axis C direction. For example, the second lens module 300 may move toward an object (subject) or move toward the first lens module 200, by the second driving unit 600.

Second guide grooves 308 corresponding to the grooves 108 of the housing 100 may be formed in one side of the second lens module 300. The second guide grooves 308 may be formed to face the grooves 108 to form spaces in which the second ball bearings 820 may be accommodated.

The fixing unit 400 may be configured to align or constantly maintain the positions of the first lens module 200 and the second lens module 300. As an example, the fixing unit 400 may align the positions of the first lens module 200 and the second lens module 300 so that optical axes of the first lens module 200 and the second lens module 300 coincide with each other. As another example, the fixing unit 400 may constantly maintain the positions of the first lens module 200 and the second lens module 300 in a non-driven state so that the first lens module 200 and the second lens module 300 do not collide with each other or do not collide with inner walls of the housing or the image sensor due to external impact.

The fixing unit 400 may include a magnet 402 and yoke members 410 and 420. For example, the fixing unit 400 may include one magnet 402, a first yoke member 410, and a second yoke member 420. However, components of the fixing unit 400 are not limited thereto. For example, the fixing unit 400 may also include two magnets and one yoke member.

The magnet 402 may be disposed on the first lens module 200. For example, the magnet 402 may be disposed on one surface of the first lens module 200 substantially parallel to an optical axis C. The magnet 402 may be formed to have a considerable size. For example, a height of the magnet 402 (in the optical axis direction) may be greater than a height of the first lens module 200. A polarity of the magnet 402 may be formed along the optical axis C direction. For example, the magnet 402 may be configured to form the greatest magnetic force at both ends thereof in the optical axis C direction. However, a polarity direction of the magnet 402 is not limited thereto.

The first yoke member 410 may be disposed on the housing 100. For example, the first yoke member 410 may be disposed on one side of the housing 100 facing a first surface of the magnet 402 disposed on the first lens module 200. As a specific example, the first yoke member 410 may be disposed to face a first polarity formed on the first surface of the magnet 402. Accordingly, an attractive force of a predetermined magnitude may always act between the first yoke member 410 and the magnet 402. The attractive force formed between the first yoke member 410 and the magnet 402 may enable position-aligning and position-fixing of the first lens module 200 with respect to the housing 100. The first yoke member 410 may be formed to have a considerable size. For example, the first yoke member 410 may be formed to have a smaller size than the magnet 402.

The second yoke member 420 may be disposed on the second lens module 300. For example, the second yoke member 420 may be disposed on a first surface of the second lens module 300 facing a second surface of the magnet 402 disposed on the first lens module 200. As a specific example, the second yoke member 420 may be disposed to face a second polarity formed on the second surface of the magnet 402. Accordingly, an attractive force of a predetermined magnitude may always act between the second yoke member 420 and the magnet 402. The attractive force formed between the second yoke member 420 and the magnet 402 may enable position-aligning and position-fixing of the second lens module 300 with respect to the first lens module 200. The second yoke member 420 may be formed to have a considerable size. For example, the second yoke member 420 may be formed to have a smaller size than the magnet 402.

The fixing unit 400 configured as described above may align the positions of the first lens module 200 and the second lens module 300 as described above, and may thus enable accurate image capturing through the first lens module 200 and the second lens module 300. In addition, the fixing unit 400 may fix the positions of the first lens module 200 and the second lens module 300 through the forces of the predetermined magnitudes, and may thus reduce a phenomenon in which the first lens module 200 and the second lens module 300 or other components of the camera module 14 are damaged due to external impact.

The first driving unit 500 may be configured to drive the first lens module 200 in the optical axis C direction. As an example, the first driving unit 500 may drive the first lens module 200 toward the object or the image sensor. The first driving unit 500 may include a first driving magnet 510 and a first driving coil 520. The first driving magnet 510 may be disposed on the first lens module 200. For example, the first driving magnet 510 may be disposed on one surface of the first lens module 200. As a specific example, the first driving magnet 510 may be disposed at a position facing the magnet 402. The first driving coil 520 may be disposed to face the first driving magnet 510. For example, the first driving coil 520 may be disposed on one side 106 of the housing 100 facing the first driving magnet 510 via a circuit board 530. As such, the first driving unit 500 may move the first lens module 200 in the optical axis C direction through driving force generated between the first driving magnet 510 and the first driving coil 520.

The second driving unit 600 may be configured to drive the second lens module 300 in the optical axis C direction. As an example, the second driving unit 600 may drive the second lens module 300 toward the object or the image sensor. The second driving unit 600 may include a second driving magnet 610 and a second driving coil 620. The second driving magnet 610 may be disposed on the second lens module 300. For example, the second driving magnet 610 may be disposed on a second surface of the second lens module 300. As a specific example, the second driving magnet 610 may be disposed at a position facing the second guide grooves 308. The second driving coil 620 may be disposed to face the second driving magnet 610. For example, the second driving coil 620 may be disposed on one side 110 of the housing 100 facing the second driving magnet 610 via a circuit board 630. As such, the second driving unit 600 may move the second lens module 300 in the optical axis C direction through driving force generated between the second driving magnet 610 and the second driving coil 620.

The camera module 14 may perform autofocusing (AF) and zoom through the first driving unit 500 and the second driving unit 600. As an example, the camera module 14 may perform the autofocusing (AF) and the zoom by moving the first lens module 200 and the second lens module 300 with a displacement of the same magnitude, moving the first lens module 200 and the second lens module 300 with displacements of different magnitudes, or moving the first lens module 200 and the second lens module 300 in different directions.

Figure 13:
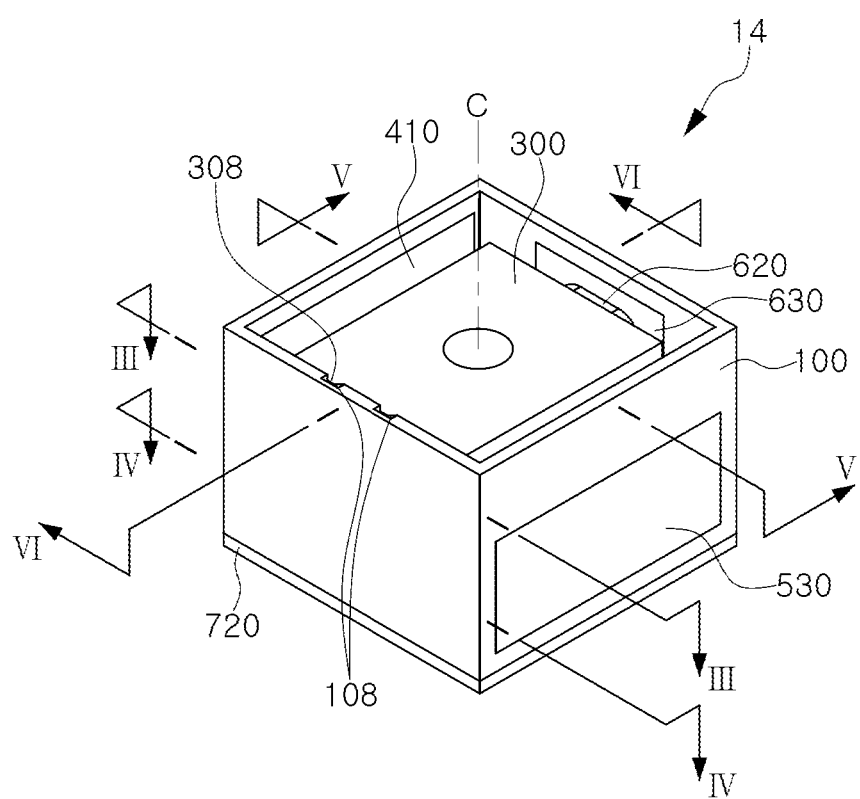
FIG. 13 is an assembled perspective view of the camera module illustrated in FIG. 12.

The camera module 14 including the above-described components may be configured to be mounted in an electronic device. For example, the camera module 14 may be manufactured in a thin form as illustrated in FIG. 13. Accordingly, the camera module 14 according to the present example embodiment may be mounted in a smartphone, a virtual reality (VR) device, an augmented reality (AR) device, a laptop computer, or the like.

Next, a transverse cross-sectional structure of the camera module 14 will be described with reference to FIGS. 14 and 15.

Figure 14:
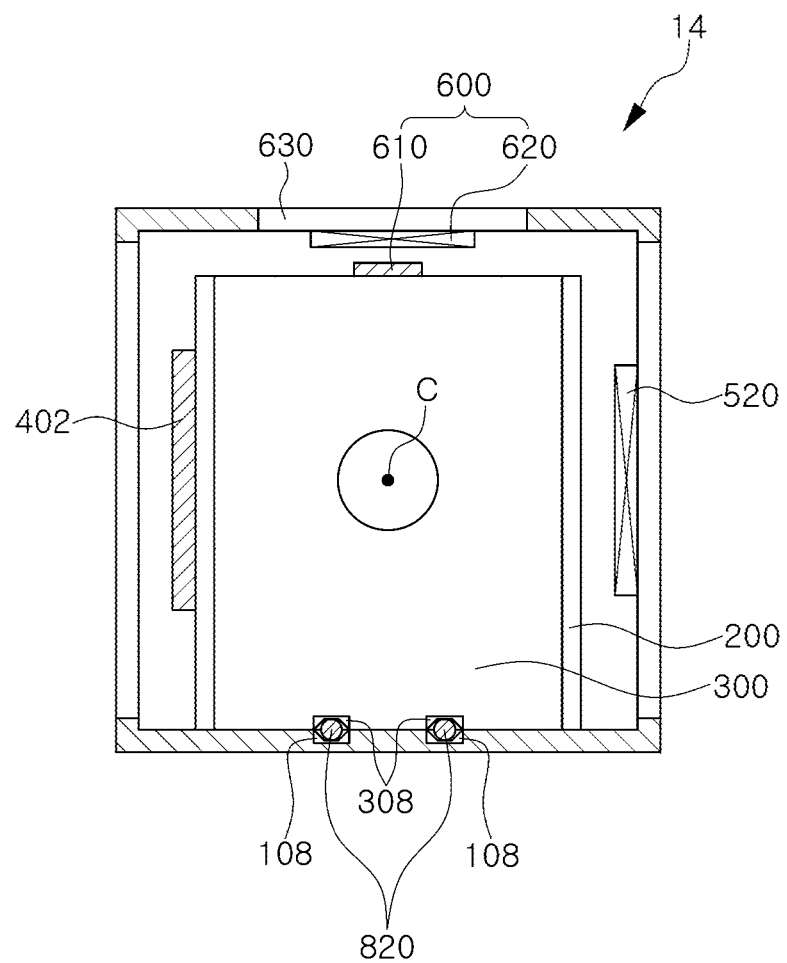
FIGS. 14, 15, 16, and 17 are cross-sectional views of the camera module illustrated in FIG. 13.

The second lens module 300 may be configured to be accommodated in the housing 100 as illustrated in FIG. 14. The second yoke member 420 and the second driving magnet 610 may be disposed on two different side surfaces of the second lens module 300, respectively. In addition, the second ball bearings 820 may be disposed on still another side surface of the second lens module 300.

The second lens module 300 in the non-driven state may be configured to be always maintained at a constant position in the housing 100. As an example, a position of the second lens module 300 in a direction crossing the optical axis C may be specified by the second ball bearings 820 and the second driving unit 600. As a specific example, the second lens module 300 may be disposed to be in close contact with the second ball bearings 820 by a magnetic force generated between the second driving magnet 610 and the second driving coil 620. As another example, a position of the second lens module 300 in the optical axis C direction may be specified by the second yoke member 420 and the magnet 402. As a specific example, a position of the second lens module 300 in the optical axis C direction may converge to a position where the attractive force between the second yoke member 420 and the magnet 402 is the greatest.

Figure 15:
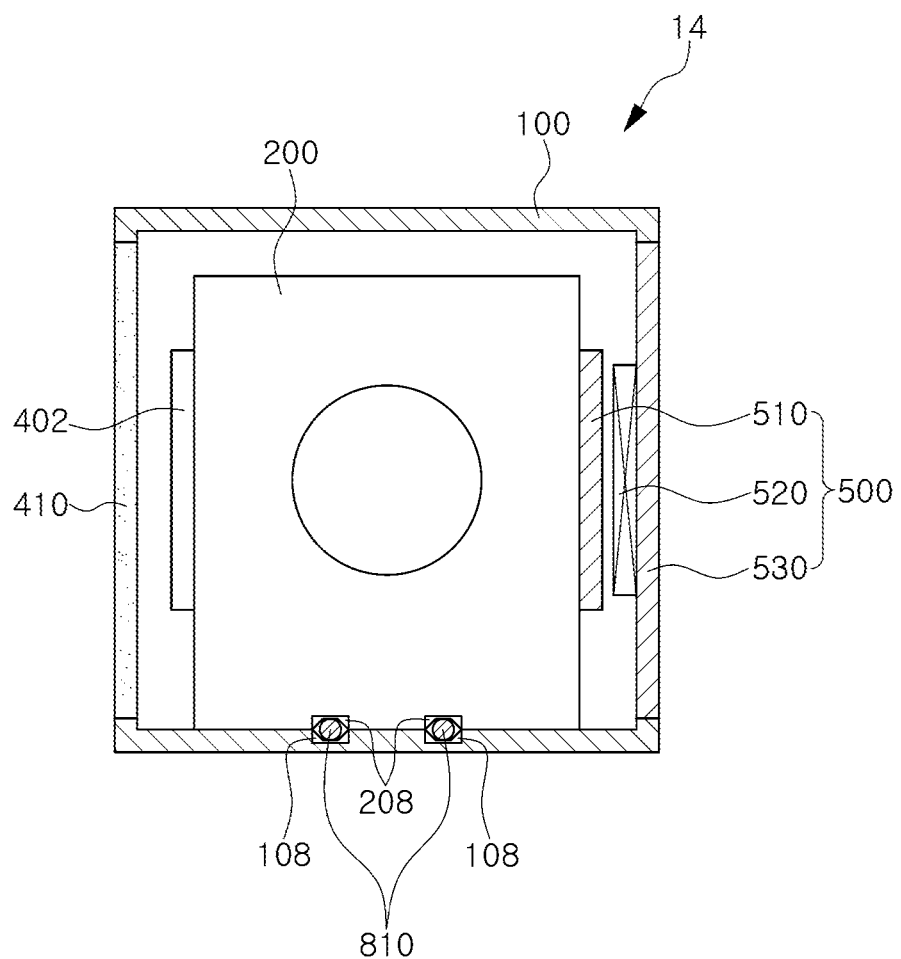

The first lens module 200 may be configured to be accommodated in the housing 100 as illustrated in FIG. 15. The first yoke member 410 and the first driving magnet 510 may be disposed on two opposing side surfaces of the first lens module 200, respectively. In addition, the first ball bearings 810 may be disposed on still another side surface of the first lens module 200.

The first lens module 200 in the non-driven state may be configured to be always maintained at a constant position in the housing 100. As an example, a position of the first lens module 200 in the direction crossing the optical axis C may be specified by the first ball bearings 810, the magnet 402, and the first driving magnet 510. As a specific example, the first lens module 200 may be disposed to be in close contact with the first ball bearings 810 by a magnetic force generated between the magnet 402 and the first yoke member 410 and a magnetic force generated between the first driving magnet 510 and the first driving coil 520. As another example, a position of the first lens module 200 in the optical axis C direction may be specified by the magnet 402 and the first yoke member 410. As a specific example, a position of the first lens module 200 in the optical axis C direction may converge to a position where the attractive force between the first yoke member 410 and the magnet 402 is the greatest.

Next, a longitudinal cross-sectional structure of the camera module 14 will be described with reference to FIGS. 16 and 17.

Figure 16:
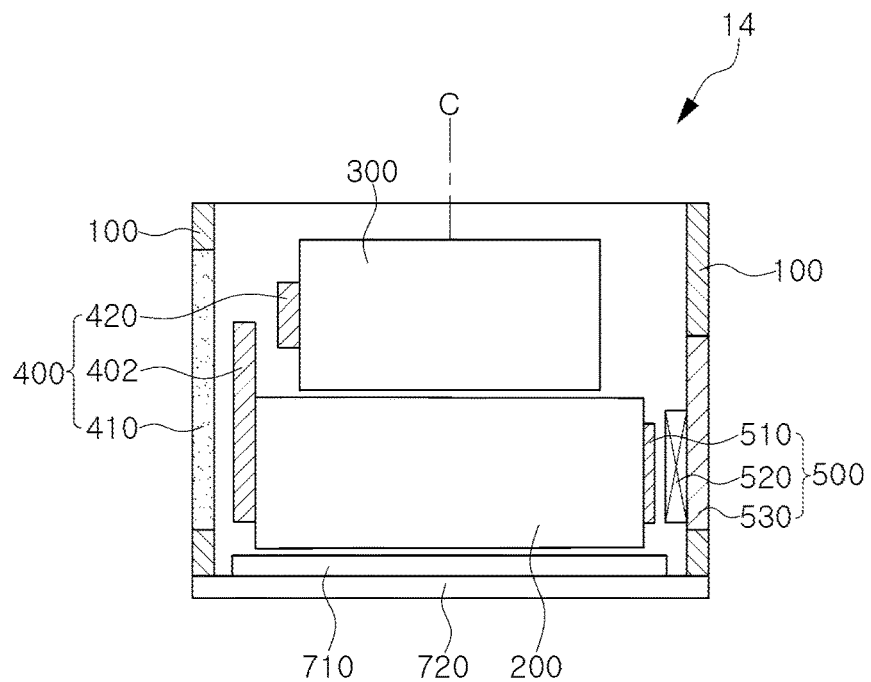
Figure 17:
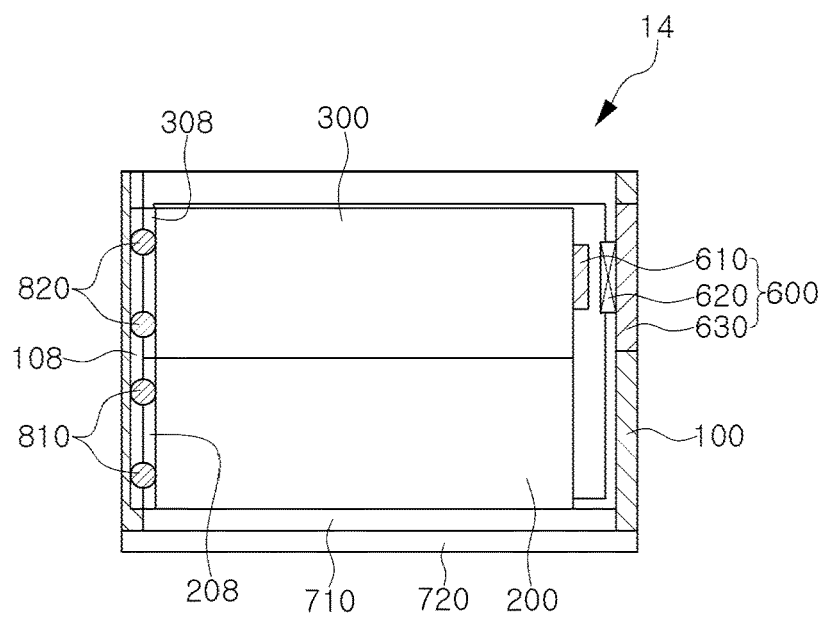
Figure 18:
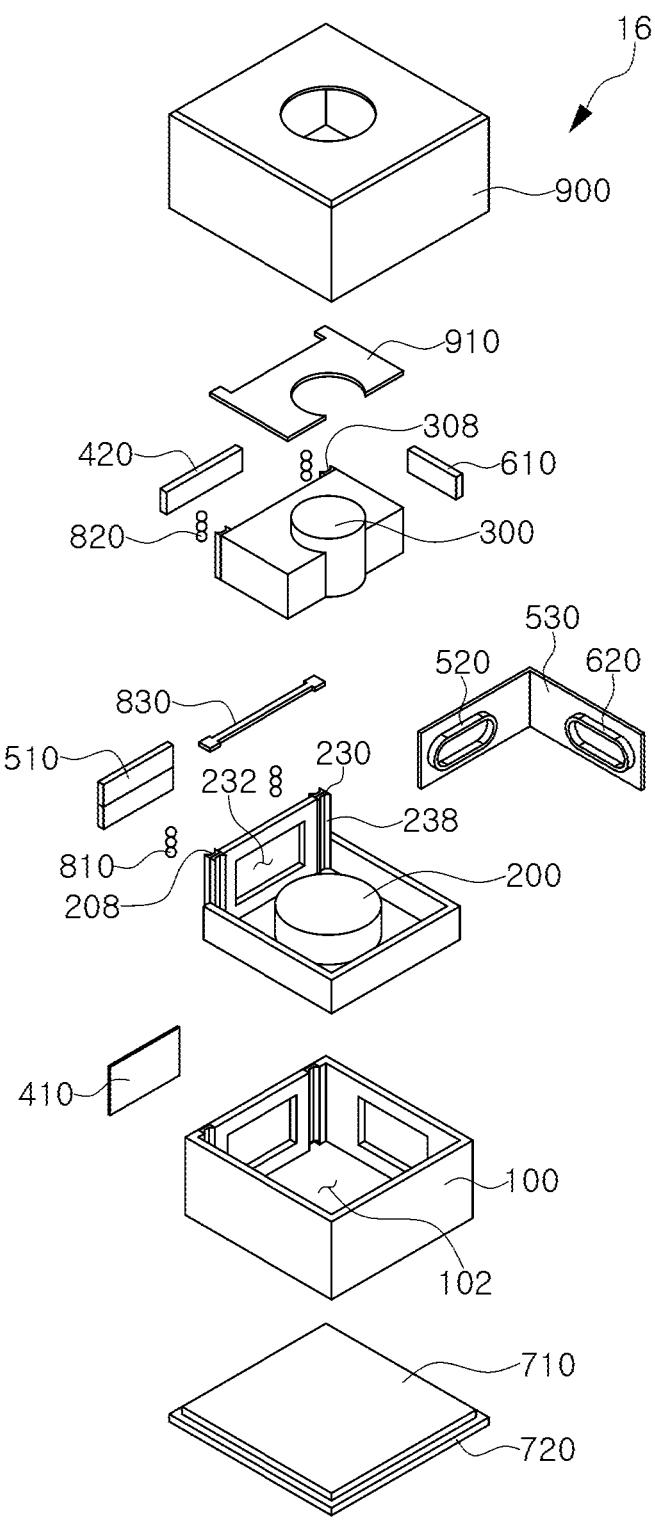
FIG. 18 is an exploded perspective view of a camera module according to still another example embodiment.

The camera module 14 may include the first lens module 200 and the second lens module 300 as illustrated in FIGS. 16 and 17. The first lens module 200 and the second lens module 300 may be sequentially disposed in the optical axis C direction. As a specific example, the first lens module 200 may be disposed below the second lens module 300 (that is, disposed adjacent to the image sensor). Accordingly, the light incident to the camera module 14 may sequentially pass through the second lens module 300 and the first lens module 200 and then be incident (form an image) on the image sensor 710. The first lens module 200 and the second lens module 300 may be configured to have different optical characteristics. As an example, a first optical system or a first lens group constituting the first lens module 200 may be configured to have positive refractive power, and a second optical system or a second lens group constituting the second lens module 300 may be configured to have negative refractive power. However, the optical characteristics of the first lens module 200 and the second lens module 300 are not limited thereto.

The first lens module 200 and the second lens module 300 may be maintained at constant positions in the non-driven state. As an example, a position of the first lens module 200 in the optical axis C direction may be fixed by the attractive force between the magnet 402 disposed on one side of the first lens module 200 and the first yoke member 410 disposed on one side of the housing 100. As another example, a position of the second lens module 300 in the optical axis C direction may be fixed by the attractive force between the second yoke member 420 disposed on one side of the second lens module 300 and the magnet 402 disposed on the first lens module 200.

Positions of the first lens module 200 and the second lens module 300 in a direction crossing the optical axis in a driven state may be constantly maintained. As an example, a position of the first lens module 200 in the direction crossing the optical axis C may be constantly maintained by maintaining a balance between the attractive force between the magnet 402 and the first yoke member 410 and an attractive force between the first driving magnet 510 and the first driving coil 520 (see FIG. 16). As another example, a position of the second lens module 300 in the direction crossing the optical axis C may be constantly maintained by the magnetic force generated between the second driving magnet 610 and the second driving coil 620 and the second ball bearings 820 (see FIG. 17).

Accordingly, in the camera module 14 according to the present example embodiment, it is possible to implement stable driving of the first lens module 200 and the second lens module 300 while significantly decreasing a shake of the first lens module 200 and the second lens module 300 due to external impact. In addition, in the camera module 14 according to the present example embodiment, the lens modules 200 and 300 may be smoothly driven in the optical axis direction by disposing the ball bearings 810 and 820 between the housing 100 and the lens modules 200 and 300.

For reference, a driving form of the camera module 14 according to the present example embodiment is the same as or similar to that of the camera module according to the above-described example embodiment, and a detailed description thereof is thus omitted.

Next, a camera module according to still another example embodiment will be described with reference to FIGS. 18 through 21.

A camera module 16 according to still another example embodiment may include a housing 100, a first lens module 200, and a second lens module 300. However, components of the camera module 16 are not limited to the above-described members. For example, the camera module 16 may further include a fixing unit 400 for aligning or maintaining positions of the lens modules 200 and 300 and first and second driving units 500 and 600 for driving the lens modules 200 and 300. In addition, the camera module 16 may further include an image sensor 710 configured to convert an optical signal incident thereon into an electrical signal. The image sensor 710 may be disposed on the housing 100 via a substrate 720. Additionally, the camera module 16 may further include a shield can 900 configured to shield electromagnetic waves. In addition, the camera module 16 may further include a separation preventing member 910 for preventing separation of the lens modules 200 and 300.

The housing 100 may be configured to accommodate the lens modules 200 and 300 therein. For example, a space 102 that may sequentially accommodate the first lens module 200 and the second lens module 300 therein may be formed in the housing 100. The space 102 may be formed so as not to hinder the movement of light. For example, the space 102 may be formed to be opened in an optical axis C direction.

The housing 100 may be configured so that the fixing unit 400 and the driving units 500 and 600 may be disposed. For example, different side parts 104, 106, and/or 110 of the housing 100 may be formed to be partially opened or completely opened so that some components of the fixing unit 400 and some components of the driving units 500 and 600 may be disposed.

The first lens module 200 may be configured to allow light incident on the camera module to form an image on the image sensor 710. To this end, the first lens module 200 may include one or more lenses having predetermined refractive power. For example, the first lens module 200 may include two or more lenses having positive or negative refractive power. However, the number of lenses accommodated in the first lens module 200 is not limited to two. The first lens module 200 may be configured to be movable in the optical axis C direction. For example, the first lens module 200 may move toward the second lens module 300 or move toward the image sensor 710, by the first driving unit 500.

A support part 230 extending in the optical axis C direction may be formed on one side of the first lens module 200. The support part 230 may be formed to face a first surface of the second lens module 300. The support part 230 may be configured to accommodate some components of the fixing unit 400 or the first driving unit 500 therein. For example, an opening 232 that may expose first and second surfaces of a first driving magnet 510 may be formed in the support part 230. The support part 230 may be configured to enable the lens modules 200 and 300 to be smoothly driven. As an example, guide grooves 208 and 238 may be formed in one side and the other side of the support part 230, respectively. First ball bearings 810 for reducing contact friction between the housing 100 and the first lens module 200 may be disposed in the guide grooves 208, and second ball bearings 820 for reducing contact friction between the first lens module 200 and the second lens module 300 may be disposed in the guide grooves 238. A stopper member 830 for preventing separation of the ball bearings 810 and 820 may be additionally disposed above the guide grooves 208 and 238.

The second lens module 300 may be configured to allow the light incident on the camera module to be incident on the first lens module 200 or reflect the light incident on the camera module to the first lens module 200. To this end, the second lens module 300 may include one or more lenses having predetermined refractive power. For example, the second lens module 300 may include one or more lenses having positive or negative refractive power. However, the number of lenses accommodated in the second lens module 300 is not limited to one. The second lens module 300 may be configured to be movable in the optical axis C direction. For example, the second lens module 300 may move toward an object (subject) or move toward the first lens module 200, by the second driving unit 600.

Guide grooves 308 corresponding to the guide grooves 238 of the support part 230 may be formed in one side of the second lens module 300. The guide grooves 308 may be formed to face the guide grooves 238 to form spaces in which the second ball bearings 820 may be accommodated.

The fixing unit 400 may be configured to align or constantly maintain the positions of the first lens module 200 and the second lens module 300. As an example, the fixing unit 400 may align the positions of the first lens module 200 and the second lens module 300 so that optical axes of the first lens module 200 and the second lens module 300 coincide with each other. As another example, the fixing unit 400 may constantly maintain the positions of the first lens module 200 and the second lens module 300 in a non-driven state so that the first lens module 200 and the second lens module 300 do not collide with each other or do not collide with inner walls of the housing or the image sensor due to external impact.

The fixing unit 400 may include a magnet 510 and yoke members 410 and 420. For example, the fixing unit 400 may include the magnet 510, a first yoke member 410, and a second yoke member 420. However, components of the fixing unit 400 are not limited thereto.

The magnet 510 may be disposed on the first lens module 200. For example, the magnet 510 may be disposed in the opening 232 of the support part 230. A polarity of the magnet 510 may be formed along the optical axis C direction. For example, the magnet 510 may be configured to form the greatest magnetic force at both ends thereof in the optical axis C direction. However, a polarity direction of the magnet 510 is not limited thereto. The magnet 510 may be used as a member for driving the first lens module 200. For example, the magnet 510 may be used as a first driving magnet constituting the first driving unit 500. Accordingly, in the following description, the magnet 510 and the first driving magnet 510 are the same component, and will be denoted by the same reference numerals.

The first yoke member 410 may be disposed on the housing 100. For example, the first yoke member 410 may be disposed on one side of the housing 100 to face a first surface of the magnet 510. As a specific example, the first yoke member 410 may be disposed to face the first surface of the magnet 510. Accordingly, an attractive force of a predetermined magnitude may always act between the first yoke member 410 and the magnet 510. The attractive force formed between the first yoke member 410 and the magnet 510 may enable position-aligning and position-fixing of the first lens module 200 with respect to the housing 100. The first yoke member 410 may be formed to have a considerable size. For example, the first yoke member 410 may be formed to have a smaller size than the magnet 510.

The second yoke member 420 may be disposed on the second lens module 300. For example, the second yoke member 420 may be disposed on one side of the second lens module 300 so as to face a second surface of the magnet 510 disposed in the support part 230. As a specific example, the second yoke member 420 may be disposed to face the second surface of the magnet 510. Accordingly, an attractive force of a predetermined magnitude may always act between the second yoke member 420 and the magnet 510. The attractive force formed between the second yoke member 420 and the magnet 510 may enable position-aligning and position-fixing of the second lens module 300 with respect to the first lens module 200. The second yoke member 420 may be formed to have a considerable size. For example, the second yoke member 420 may be formed to have a smaller size than the magnet 510.

The fixing unit 400 configured as described above may align the positions of the first lens module 200 and the second lens module 300 as described above, and may thus enable accurate image capturing through the first lens module 200 and the second lens module 300. In addition, the fixing unit 400 may fix the positions of the first lens module 200 and the second lens module 300 through the forces of the predetermined magnitudes, and may thus reduce a phenomenon in which the first lens module 200 and the second lens module 300 or other components of the camera module 16 are damaged due to external impact.

The first driving unit 500 may be configured to drive the first lens module 200 in the optical axis C direction. As an example, the first driving unit 500 may drive the first lens module 200 toward the object or the image sensor. The first driving unit 500 may include the first driving magnet 510 and a first driving coil 520. The first driving magnet 510 may be disposed on the first lens module 200. For example, the first driving magnet 510 may be disposed on one surface of the first lens module 200. As a specific example, the first driving magnet 510 may be disposed in the support part 230. The first driving coil 520 may be disposed to face the first driving magnet 510. For example, the first driving coil 520 may be disposed on one side 106 of the housing 100 facing the first driving magnet 510 via a circuit board 530. As such, the first driving unit 500 may move the first lens module 200 in the optical axis C direction through driving force generated between the first driving magnet 510 and the first driving coil 520.

The second driving unit 600 may be configured to drive the second lens module 300 in the optical axis C direction. As an example, the second driving unit 600 may drive the second lens module 300 toward the object or the image sensor. The second driving unit 600 may include a second driving magnet 610 and a second driving coil 620. The second driving magnet 610 may be disposed on the second lens module 300. For example, the second driving magnet 610 may be disposed on one surface of the second lens module 300. As a specific example, the second driving magnet 610 and the second yoke member 420 may be disposed on a first side surface and a second side of the second lens module 300 crossing each other, respectively. The second driving coil 620 may be disposed to face the second driving magnet 610. For example, the second driving coil 620 may be disposed on one side of the housing 100 facing the second driving magnet 610 via the circuit board 530. As such, the second driving unit 600 may move the second lens module 300 in the optical axis C direction through driving force generated between the second driving magnet 610 and the second driving coil 620. Meanwhile, the circuit board 530 may be configured so that the first driving coil 520 and the second driving coil 620 may be disposed. For example, the circuit board 530 may be formed of a flexible material capable of being bent, or may be configured in a form in which a bent part is formed on one side thereof.

The camera module 16 may perform autofocusing (AF) and zoom through the first driving unit 500 and the second driving unit 600. As an example, the camera module 16 may perform the autofocusing (AF) and the zoom by moving the first lens module 200 and the second lens module 300 with a displacement of the same magnitude, moving the first lens module 200 and the second lens module 300 with displacements of different magnitudes, or moving the first lens module 200 and the second lens module 300 in different directions. For reference, a driving form of the camera module 16 according to the present example embodiment is the same as or similar to that illustrated in FIGS. 9 through 11, and a detailed description thereof is thus omitted.

The shield can 900 may be configured to cover a significant portion of the housing 100. For example, the shield can 900 may be configured to cover an upper portion and four side surfaces of the housing. The shield can 900 may be configured to shield electromagnetic waves. For example, the shield can 900 may be formed of a metal or a material including a metal to reduce or block a phenomenon in which harmful electromagnetic waves are introduced into the camera module 16. The separation preventing member 910 may be disposed in the housing 100 and be configured to prevent separation of the lens modules 200 and 300. For example, the separation preventing member 910 may be firmly fixed to the upper portion of the housing 100 and press the lens modules 200 and 300 inward of the housing 100. However, the separation preventing member 910 does not limit driving of the lens modules 200 and 300 in the optical axis direction. For example, the separation preventing member 910 may be configured in an elastically deformable shape or be formed of an elastically deformable material to allow driving of the lens modules 200 and 300 in the optical axis direction within a predetermined range.

Figure 19:
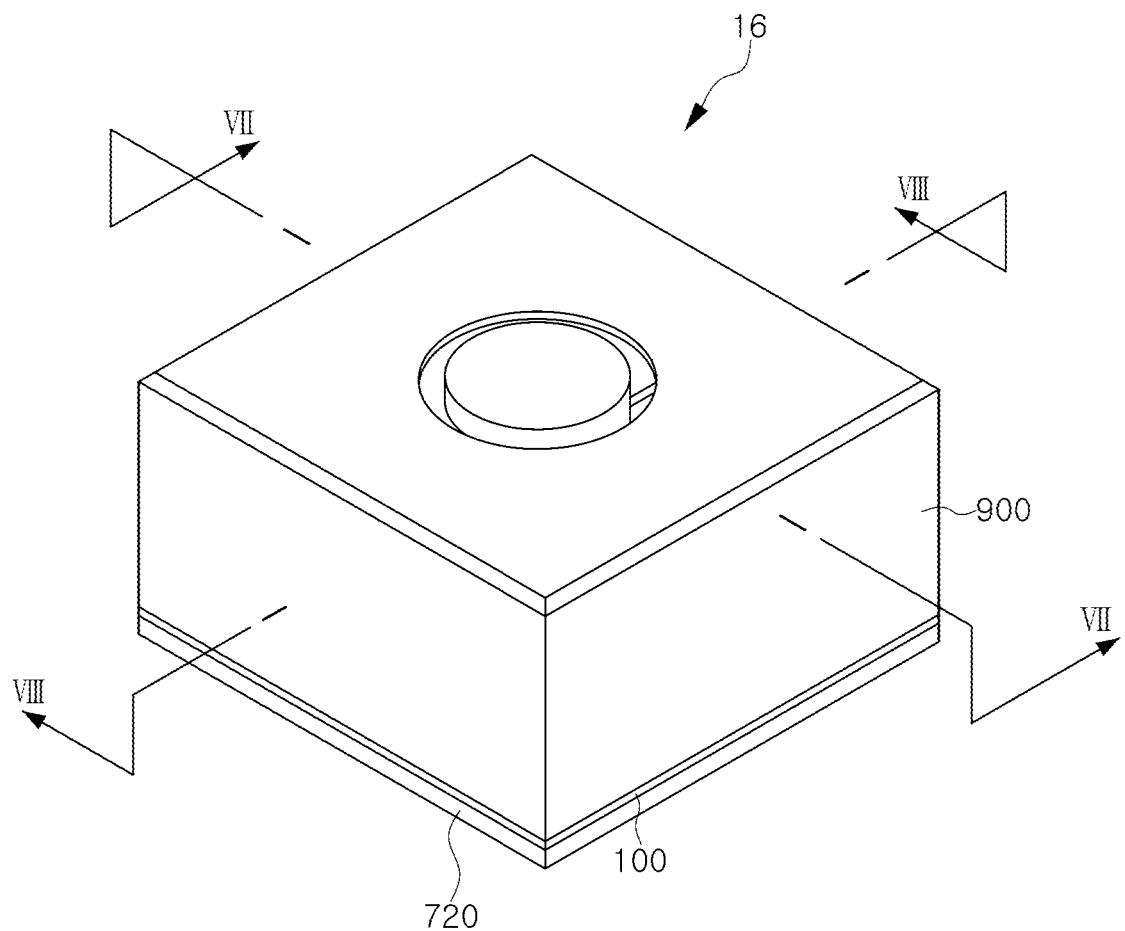
FIG. 19 is an assembled perspective view of the camera module illustrated in FIG. 18.

The camera module 16 configured as described above may be configured in a form in which it occupies a small space as illustrated in FIG. 19. Accordingly, the camera module 16 may be mounted in a small electronic device. For example, the camera module 16 may be mounted in a smart phone, a virtual reality (VR) device, an augmented reality (AR) device, a laptop computer, various mobile electronic devices, and the like.

Next, a cross-sectional structure of the camera module 16 will be described with reference to FIGS. 20 and 21.

Figure 20:
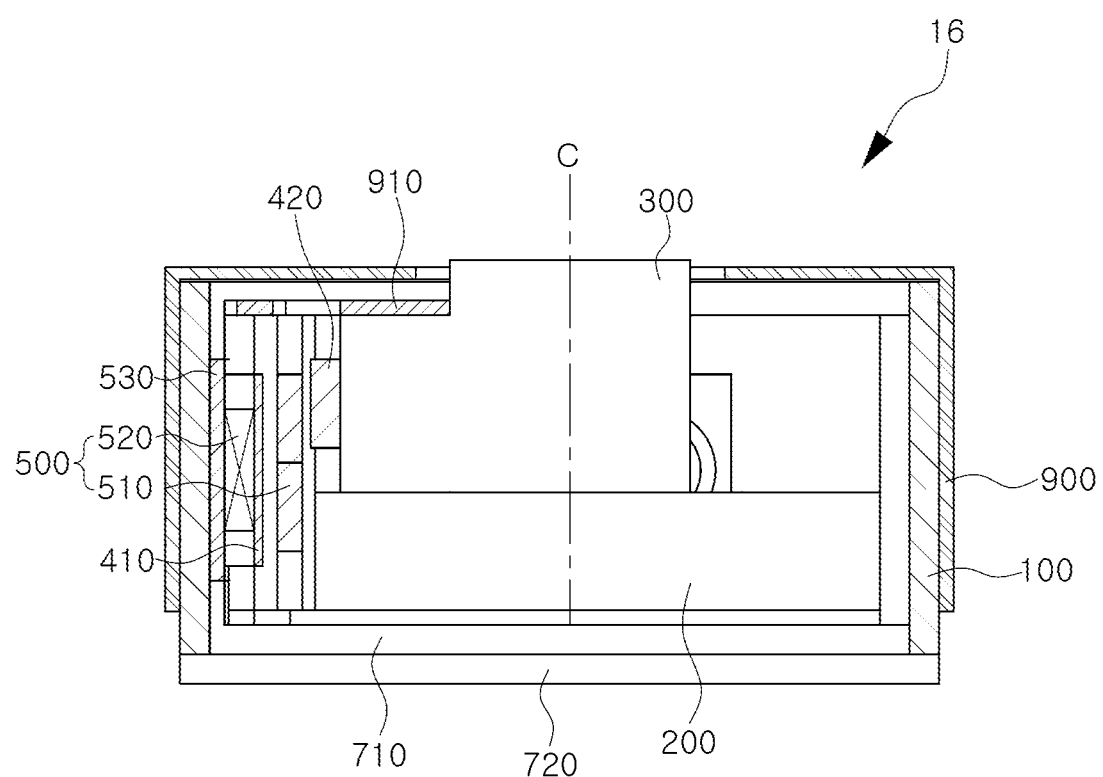
FIGS. 20 and 21 are cross-sectional views of the camera module illustrated in FIG. 19.
Figure 21:
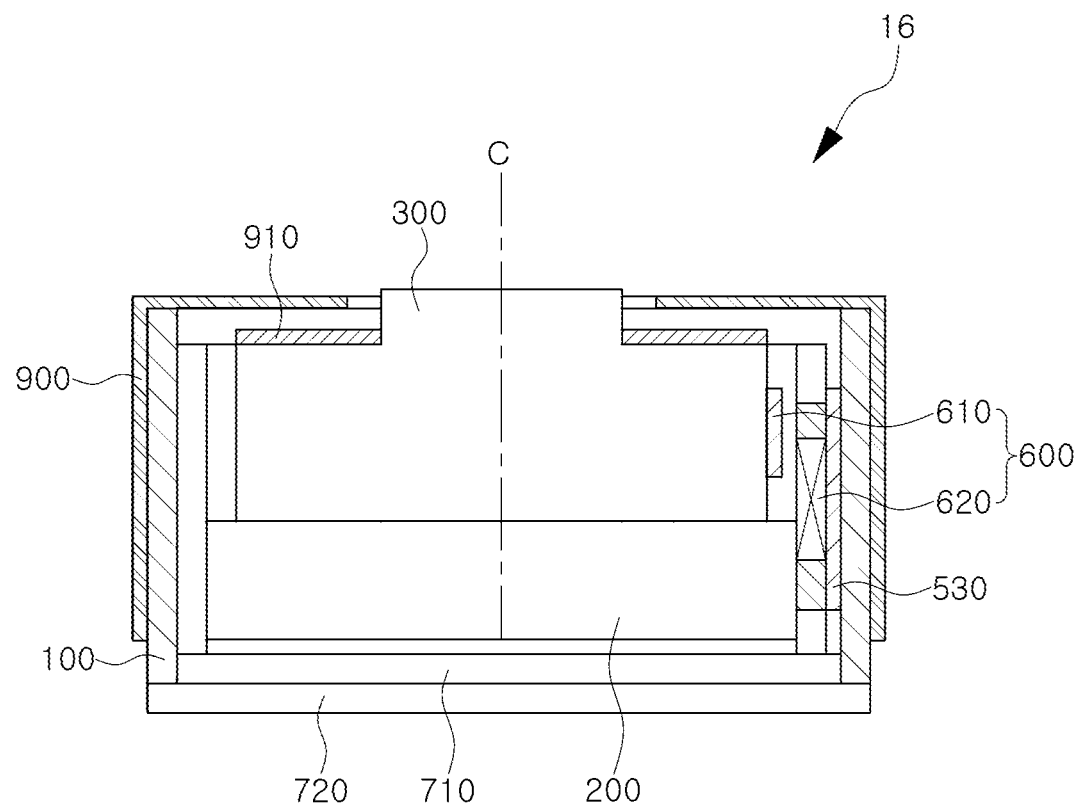

The camera module 16 may include the first lens module 200 and the second lens module 300 disposed at a predetermined interval along the optical axis C direction as illustrated in FIG. 20. As a specific example, the first lens module 200 and the second lens module 300 may be sequentially disposed along an object direction from the image sensor 710. The first lens module 200 and the second lens module 300 may be disposed to have the same optical axis. For example, light incident through the second lens module 300 may be incident on the first lens module 200 without being reflected or refracted to the surroundings.

The camera module 16 may be configured so that position-aligning or position-fixing of the first lens module 200 and the second lens module 300 is possible. For example, the positions of the first lens module 200 and the second lens module 300 may be aligned or fixed by the first yoke member 410, the first driving magnet 510, and the second yoke member 420 disposed on one side of the housing 100. As an example, the first lens module 200 may be fixed at a specific position by the attractive force between the first yoke member 410 disposed on one side of the housing 100 and the first driving magnet 510 disposed in the support part 230. As another example, the second lens module 300 may be fixed at a specific position by the attractive force between the first driving magnet 510 disposed in the support part 230 and the second yoke member 420 disposed on one side of the second lens module 300. For example, the positions of the first lens module 200 and the second lens module 300 may be aligned with respect to the first driving magnet 510 disposed in the first lens module 200. Accordingly, according to the present example embodiment, the optical axis of the first lens module 200 and the optical axis of the second lens module 300 may also be aligned together with positions of the first lens module 200 and the second lens module 300 in a horizontal direction (positions of the first lens module 200 and the second lens module 300 in a direction crossing the optical axis). Meanwhile, the position of the second lens module 300 may be aligned also by the second driving unit 600. For example, the first driving magnet 610 and the first driving coil 620 may allow a force of a predetermined magnitude on act on the second lens module 300 to allow the position of the second lens module 300 with respect to the first lens module 200 to be always constantly maintained.

The first yoke member 410, the first driving magnet 510, and the second yoke member 420 may be disposed at predetermined intervals along the direction crossing the optical axis. The first yoke member 410, the first driving magnet 510, and the second yoke member 420 may be configured to generate a magnetic force of the same magnitude. For example, a distance from the first yoke member 410 to the first surface of the first driving magnet 510 and a distance from the second yoke member 520 to the second surface of the first driving magnet 510 may be substantially the same as each other. Alternatively, a magnitude of a magnetic force generated between the first yoke member 410 and the first driving magnet 510 may be substantially the same as a magnitude of a magnetic force generated between the second yoke member 420 and the first driving magnet 510. The latter condition may be adjusted by adjusting sizes of the yoke members 410 and 420 or the distances between the yoke members 410 and 420 and the first driving magnet 510.

As set forth above, according to one or more example embodiments in the present disclosure, the camera module capable of autofocusing and zoom may be provided.

In addition, in the present disclosure, a structure of the camera module may be simplified to reduce a manufacturing cost of the camera module while enabling miniaturization of the camera module.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing;
   a first lens module configured to be movable in a first direction of the housing;
   a second lens module configured to be movable in the first direction;
   a first magnet disposed on the first lens module;
   a first yoke member disposed on the housing so as to face a first side surface of the first magnet and configured to limit a movement position of the first lens module with respect to the housing; and
   a second yoke member disposed on the second lens module so as to face a second side surface of the first magnet and configured to limit a movement position of the second lens module with respect to the first lens module.

2. The camera module of claim 1, further comprising a first driving unit driving the first lens module in the first direction.

3. The camera module of claim 2, wherein the first driving unit comprises:
   the first magnet; and
   a first driving coil disposed on the housing.

4. The camera module of claim 1, further comprising a second driving unit driving the second lens module in the first direction.

5. The camera module of claim 4, wherein the second driving unit comprises:
   a second magnet disposed on the second lens module; and
   a second driving coil disposed on the housing.

6. The camera module of claim 5, wherein the second yoke member is disposed on a first surface of the second lens module, and
   wherein the second magnet is disposed on a second surface of the second lens module.

7. The camera module of claim 1, further comprising first ball bearings disposed between the housing and the first lens module.

8. The camera module of claim 1, further comprising a support part formed to face a first surface of the second lens module extending in the first direction.

9. The camera module of claim 8, wherein the first magnet is disposed in the support part, and
   wherein a hole for exposing one or more of the first surface and the second surface of the first magnet is formed in the support part.

10. The camera module of claim 8, wherein guide grooves extending along the first direction and accommodating ball bearings therein are formed in the support part.

11. The camera module of claim 8, further comprising second ball bearings disposed between the support part and the second lens module.

12. A camera module comprising:
   a first lens module comprising a first lens group;
   a second lens module comprising a second lens group;
   a housing configured to accommodate the first lens module therein;
   a first driving unit configured to drive the first lens module in an optical axis direction of the first lens group;
   a second driving unit configured to drive the second lens module in the optical axis direction;
   a first yoke member disposed on a first side surface of the housing;
   a second yoke member disposed on a first side surface of the second lens module; and
   a magnet disposed on a first side surface of the first lens module,
   wherein the first yoke member, the magnet, and the second yoke member are sequentially disposed at intervals along a direction crossing an optical axis.

13. The camera module of claim 12, wherein a first surface of the magnet faces the first yoke member, and a second surface of the magnet faces the second yoke member.

14. The camera module of claim 12, wherein the first driving unit comprises:
- a first driving magnet disposed on a second side surface of the first lens module; and
- a first driving coil disposed on a second side of the housing.

15. The camera module of claim 12, wherein the second driving unit comprises:
- a second driving coil disposed on a third side surface of the housing; and
- a second driving magnet disposed on one side surface of the second lens module facing the third side surface of the housing.

16. The camera module of claim 12, further comprising:
first ball members disposed between the housing and the first lens module; and
second ball members disposed between the first lens module and the second lens module.

17. A camera module comprising:
- a housing;
- a first magnetic member disposed in the housing;
- a first lens module disposed in the housing and movable in a first direction;
- a second magnetic member disposed on the first lens module to face the first magnetic member;
- a second lens module disposed in the housing and movable in the first direction;
- a third magnetic member disposed on the second lens module to face the second magnetic member, wherein the first magnetic member and the second magnetic member are pulled towards each other, and wherein the second magnetic member and the third magnetic member are pulled towards each other.

18. The camera module of claim 17, wherein the first magnetic member comprises a first yoke member,
wherein the second magnetic member comprises a first magnet, and
wherein the third magnetic member comprises a second yoke member.

19. The camera module of claim 17, further comprising a first driving coil disposed on the housing to face the second magnetic member,
wherein the second magnetic member comprises a first magnet, and
wherein magnetic interaction between the first driving coil and the first magnet move the first lens module in the first direction.

20. The camera module of claim 19, further comprising:
a second magnet disposed on the second lens module; and
a second driving coil disposed on the housing to face the second magnetic member,
wherein magnetic interaction between the second driving coil and the second magnet move the second lens module in the first direction.

21. The camera module of claim 17, further comprising:
first ball members disposed between the housing and the first lens module; and
second ball members disposed between the second lens module and one or more of the housing and the first lens module.

* * * * *